US009821979B2

(12) United States Patent
Schwartz et al.

(10) Patent No.: US 9,821,979 B2
(45) Date of Patent: Nov. 21, 2017

(54) SUPPORT DEVICE FOR AN ELONGATE ARTICLE

(71) Applicant: Kongsberg Oil & Gas Technologies AS, Asker (NO)

(72) Inventors: Johan Peter Schwartz, Eidsfoss (NO); Kjetil Hoyer, Olso (NO)

(73) Assignee: PARKBURN PRECISION HANDLING SYSTEMS LIMITED, Hamilton (GB)

( * ) Notice: Subject to any disclaimer, the term of this patent is extended or adjusted under 35 U.S.C. 154(b) by 66 days.

(21) Appl. No.: 14/389,241

(22) PCT Filed: Mar. 25, 2013

(86) PCT No.: PCT/IB2013/052363
§ 371 (c)(1),
(2) Date: Sep. 29, 2014

(87) PCT Pub. No.: WO2013/144819
PCT Pub. Date: Oct. 3, 2013

(65) Prior Publication Data
US 2015/0086274 A1     Mar. 26, 2015

(30) Foreign Application Priority Data

Mar. 29, 2012   (NO) .................................... 20120392
Aug. 22, 2012   (NO) .................................... 20120938

(51) Int. Cl.
*B65H 51/20*    (2006.01)
*B65H 51/04*    (2006.01)
(Continued)

(52) U.S. Cl.
CPC ............. *B65H 51/04* (2013.01); *B65H 51/20* (2013.01); *F16L 1/203* (2013.01); *B65H 2301/414321* (2013.01); *F16L 1/18* (2013.01)

(58) Field of Classification Search
CPC ........ B65H 51/02; B65H 51/04; B65H 51/06; B65H 51/20; B65H 51/22; B65H 2301/414321; F16L 1/203
See application file for complete search history.

(56) References Cited

U.S. PATENT DOCUMENTS 1,744,779 A  *  1/1930  Massingham .......... B65H 51/02
                                                   226/170
3,116,050 A  *  12/1963  Herrmann .............. B65H 51/02
                                                   226/170
(Continued)

FOREIGN PATENT DOCUMENTS

CN         85105011 A      12/1986
CN        102020003 A       4/2011
(Continued)

OTHER PUBLICATIONS

Machine translation of DE 3440282, retrieved Aug. 4, 2016.*
(Continued)

*Primary Examiner* — Michael McCullough
(74) *Attorney, Agent, or Firm* — Osha Liang LLP

(57) ABSTRACT

The invention concerns a capstan reel (10) and a method for transporting an elongated article (6, 6a, 6b, 39, 42, 43, 45a, 47) between a floating vessel (2) and a body of water situated below the vessel, and a vessel applying such a capstan reel. The capstan reel comprises a rotatable cylindrical body (100) for spooling the elongated article around the body's axial axis (11), said body comprising a cylindrical contacting surface (35) for indirectly supporting at least a portion of the elongated article. Furthermore, the capstan reel comprises an endless chain (18) spooled at least partly around the cylindrical body in a helical direction relative to the axial axis of the body, acting as an intermediate layer between the cylindrical contacting surface and the intended elongated article, and a chain transfer guide (17) extending (Continued)

across the axial length of the cylindrical body for guiding the endless chain between a chain exit region (T) in a first axial end region (7a) of the cylindrical body and a chain entry region (E) in a second axial end region (7b), the second axial end region being situated at the opposite axial end of the cylindrical body.

22 Claims, 23 Drawing Sheets

(51) Int. Cl.
*F16L 1/20* (2006.01)
*F16L 1/18* (2006.01)

(56) References Cited

U.S. PATENT DOCUMENTS

| | | | |
|---|---|---|---|
| 5,346,333 A | 9/1994 | Maloberti et al. | |
| 5,971,666 A | 10/1999 | Martin et al. | |
| 6,761,506 B2 * | 7/2004 | De Lang | F16L 1/203 242/154 |
| 2012/0061504 A1 | 3/2012 | Powell | |

FOREIGN PATENT DOCUMENTS

| | | | |
|---|---|---|---|
| CN | 201801246 U | 4/2011 | |
| CN | 102039988 A | 5/2011 | |
| DE | 3440282 C1 * | 2/1986 | B21C 47/20 |
| GB | 2178129 A | 2/1987 | |
| WO | 03/004915 A1 | 1/2003 | |
| WO | 2012044179 A1 | 4/2012 | |

OTHER PUBLICATIONS

Office Action dated Jul. 29, 2015, in corresponding Chinese Patent Application No. 201380028570.5 (5 pages).
Written Opinion issued in corresponding Singaporean Application No. 11201406121V, dated Dec. 15, 2015 (6 pages).
Kongsberg.; "News Archive—Kongsberg Gruppen"; Jan. 10, 2013; XP002690121; Retrieved from the Internet; URL:http://www.kongsberg.com/en/kog/news/newsarchive/; (2 pages).
Kongsberg.; "Kongsberg signs deal with offshore intallation group"; Oct. 24, 2011; XP002600120; Retrieved from the Internet; URL:http://www.kongsberg.com/en/kog/news/2011//october/2410_cris_deal/; (2 pages).
International Search Report issued in PCT/IB2013/052363 dated Jun. 13, 2013 (3 pages).
Written Opinion of the International Searching Authority issued in PCT/IB2013/052363 dated Jun. 13, 2013 (8 pages).
Kongsberg.; "Kongsberg signs deal with offshore intallation group"; Oct. 24, 2011; XP002690120; Retrieved from the Internet; URL:http://www.kongsberg.com/en/kog/news/2011/october/2410_cris_deal/ (1 page).
Kongsberg.; "News Archive—Kongsberg Gruppen"; Jan. 10, 2013; XP002690121; Retrieved from the Internet; URL:http://www.kongsberg.com/en/kog/news/newsarchive/ (1 page).
Kongsberg.; "Capstan Reel Installation System"; Jan. 16, 2012; XP002690122; Retrieved from the Internet; URL:http://web.archive.org/web/20120116024231/http://www.kongsberg.com/en/kogt/discipline/subsea/technologysystemmanagementandsolutions/crisinstallationsystem/ (1 page).

* cited by examiner

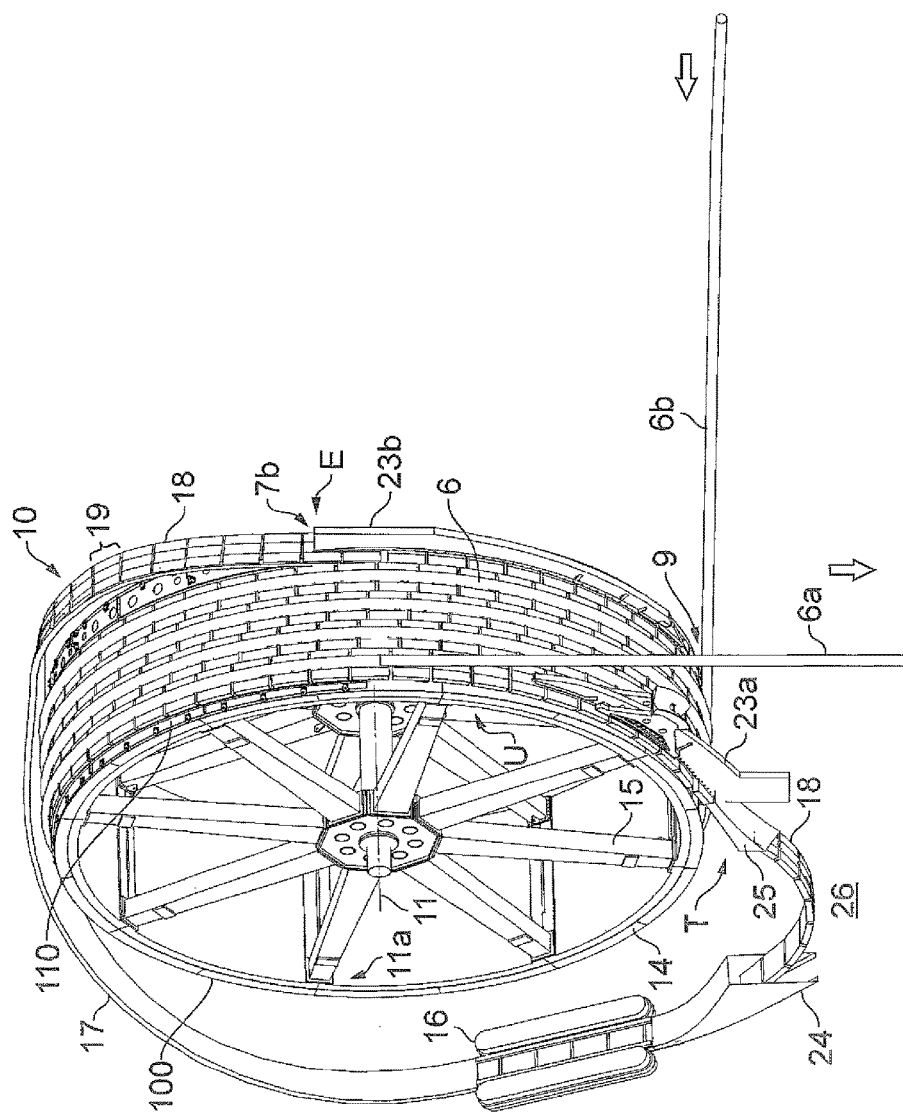

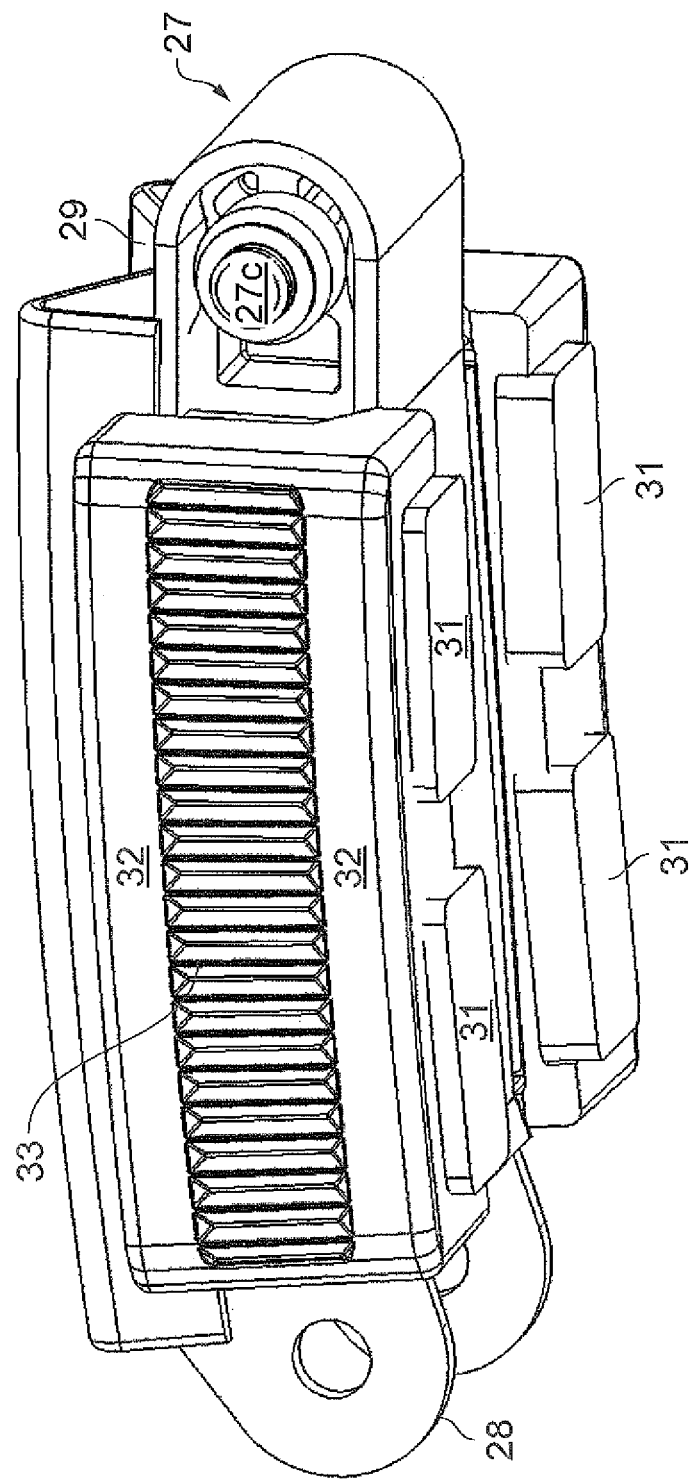

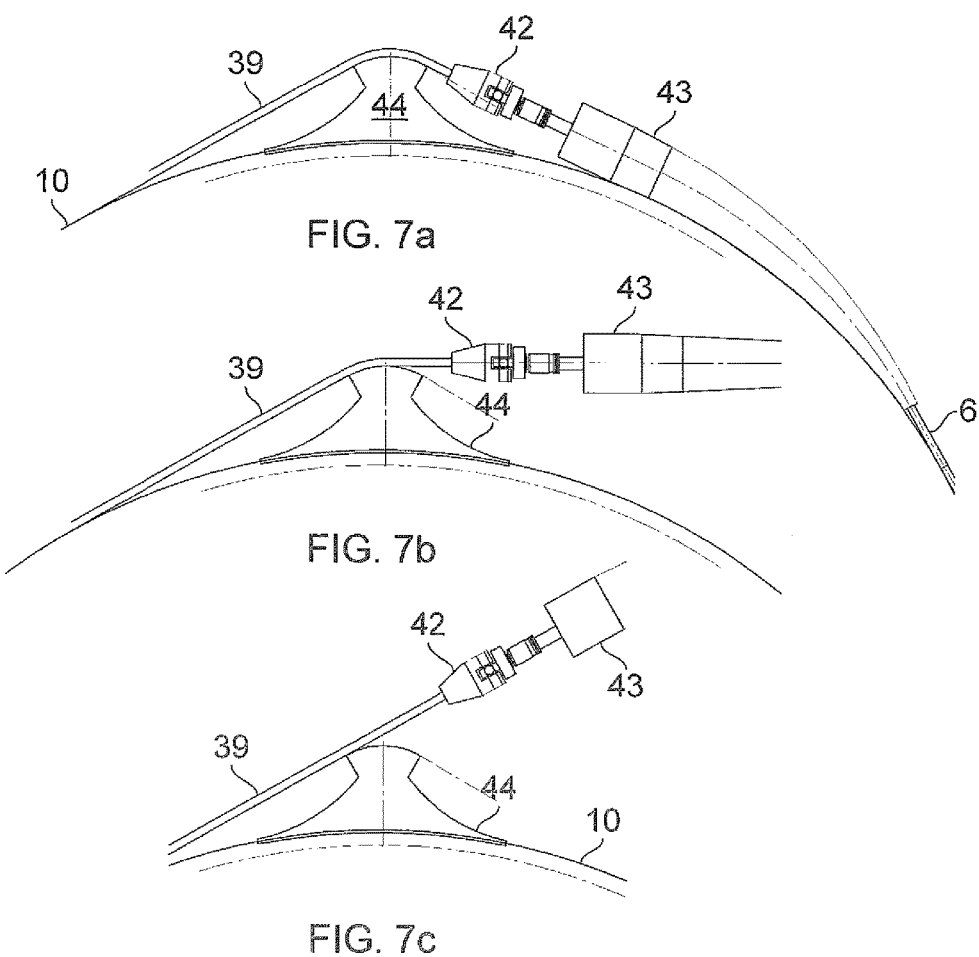

SUPPORT DEVICE FOR AN ELONGATE ARTICLE

CROSS-REFERENCE TO RELATED APPLICATIONS

This application is a National Stage application of International Patent Application No. PCT/IB2013/052363, filed on Mar. 25, 2013, which claims priority to Norwegian Patent Application No. 20120938, filed on Aug. 22, 2012 and Norwegian Patent Application No. 20120392, filed on Mar. 29, 2012. All priority applications are hereby incorporated by reference in their entirety.

FIELD OF THE INVENTION

The invention relates to apparatuses and methods for controlling and suspending an elongate article, as specified in the preamble of the independent claims. The invention has particular use in the laying of such elongate articles as rigid pipes, flexible pipes, risers, flowlines, pipelines, umbilicals, fibre ropes or cables, from a vessel at sea.

BACKGROUND OF THE INVENTION

Installation of e.g. flow lines at increased water depths introduces new challenges caused by the increased weight of the product and the corresponding increase in tension of the material during the laying operation. This will have impact on the risk of damaging the product, on the safety handling during the operation, and also on the cost of the product and of the pipe laying operation. In particular, the increasing water depths necessitate general upgrades of the existing operating parameters and equipments. Examples are increased squeeze pressure around flow lines, increased number of tensioners, higher vertical lay system (VLS) towers and wider ships due to higher stability requirements.

Methods and apparatuses for laying flexible pipes, cables, etc. on a seabed are well known. For example, WO 03/004915 (Stockstill) and U.S. Pat. No. 5,346,333 (Maloberti, et al.) both describe conventional VLS. In a traditional VLS, the flexible pipe is held by tensioners, often in series and having synchronized motions in order to control the laying process. However, such conventional VLS necessitate the handling of high loads from the deep water flow lines involving the need for a high number of tensioners making the overall system inter alia large, cumbersome and costly with high demands of continuous maintenance.

The state of the art also includes WO 2012/044179 A1 (Haugen, et al.), which describes an apparatus for feeding an elongate article from a floating vessel and into a body of water by using a rotatable cylindrical body. An endless chain of elements are wrapped a number of times around the cylindrical body, and the elements are configured for supporting the elongate article. The number of turns must be adjusted depending on requirements such as load, available space, cost, etc. In a typical laying operation the number of turns are more than 2, preferably between 2 to 5 times, for example 3.75 times. This solution reduce the need for an amount of tensioners significantly by utilizing the well known capstan effect to relieve most of the load from the elongated article. It suffers though from the disadvantage that a dedicated guiding means situated underneath the cylindrical body for guiding the mainly parallel arranged elongated articles in the radial direction during winding. As for VLS this additional arrangement makes the system somewhat complex, maintenance demanding and costly.

In addition, non of the above mentioned publications discloses a solution for handling end termination supports (ETS) for the flow lines/elongated articles that enables a smooth laying operations without manual intervention.

The present applicant has devised and embodied this invention to overcome the shortcomings of the prior art and to obtain further advantages.

The invention makes use of the well-known capstan effect which relates to the hold-force required to counter a load-force when a flexible line is wound around a cylinder (a bollard, a winch or a capstan). Because of the interaction of frictional forces and tension, the tension on a line wrapped around a capstan may be different on either side of the capstan. A small holding force exerted on one side can carry a larger loading force on the other side. This is the principle by which a capstan-type device operates.

The formula which relates the hold-force to the load-force can in most cases be approximated as:

$$T_1 = T_0 e^{\mu \phi}$$

where $T_1$ and $T_0$ represent the outgoing and incoming tensions, respectively, $\mu$ is the frictional coefficient between contacting solids such as reel surface and flexible tube, and $\phi$ is the contact angle or the total angle swept by all turns of the rope, measured in radians. That is, if the flexible tube or rope performs 3.75 turns around the reel, $\phi$ is $3.75 \cdot 2\pi = 7.5\pi$. For the particular application disclosed herein typical values of $\mu$ are in the range from 0.1 to 0.3. Hence, flexible tubes winded 3.75 times around the reel experience an approximate increase in tension or loading force of roughly 10 to 1200 times the incoming tension or holding force.

SUMMARY OF THE INVENTION

The invention is set forth and characterized in the main claims, while the dependent claims describe other characteristics of the invention.

It is therefore provided a capstan reel for transporting an elongated article between a floating vessel and a body of water situated below the vessel, wherein the capstan reel comprises a rotatable cylindrical body for spooling the elongated article around the body's axial axis, said body comprising a cylindrical contacting surface for indirectly supporting at least a portion of the elongated article. The capstan reel further comprises an endless chain spooled at least partly around the cylindrical body in a helical direction relative to the axial axis of the body, acting as an intermediate layer between the cylindrical contacting surface and the intended elongated article, and a chain transfer guide extending across the axial length of the cylindrical body for guiding the endless chain between a chain exit region in a first axial end region of the cylindrical body and a chain entry region in a second axial end region, the second axial end region being situated at the opposite axial end of the cylindrical body.

The expression endless chain is hereinafter defined as a chain connected in an end-to-end loop.

Preferably the endless chain will in use enter and exit the cylindrical body with a non-zero entry angle and a non-zero exit angle, respectively, the entry angle and the exit angle being defined as the angle relative to the overall rotational direction of the cylindrical body. These angles may be identical or near identical to each other.

The capstan reel may as an advantageous embodiment further comprise helical inducing means at or near either or both of the first axial end region and the second axial end region, wherein the helical inducing means is configured to enforce the helical direction of the endless chain. The at least one of the helical inducing means may be situated at or near the chain entry region, i.e. the region where the endless chain enters the cylindrical body. Likewise the chain exit region is herein defined as the region where the endless chain exits the cylindrical body. Said helical inducing means may with advantage partly follow the cylindrical contacting surface.

The enforcement/exertion of the helical direction may also be at least partly caused by sliding contact between one or both of the lateral side of the endless chain and the at least one helical inducing means.

In one embodiment of the invention the endless chain may be composed of a multiple of support elements arranged in an end-to-end relationship via connectors, wherein the connectors allows relative movement between adjacent support elements. Each of these support element may comprise a support face for supporting the elongated article during winding around the cylindrical body, the geometry of the support face being designed to provide support and to restrict relative movement between the intended elongated article and the corresponding one or more support elements, side skid surfaces for providing sliding contact between the support element and at least one adjacent support element in the axial direction of the cylindrical body, and skid pads arranged on the side opposite of the support face to provide frictional contact between the support element and the cylindrical contacting surface, wherein the skid pads are configured to ensure a frictional contact that both ensure maintenance of a capstan effect on the elongated article during use and to allow relative longitudinal movement between the support elements.

In yet another preferred embodiment of the invention the capstan reel further comprises a first radial pressure beam and a second radial pressure beam connected to the cylindrical body at or near the chain exit region and the chain entry region, respectively, the radial pressure beams being configured to ensure desired spatial positioning of the endless chain during exit out of, and re-entry into, the cylindrical body. The above mentioned helical inducing means may be connected, or form an integral part of, either or both the first and the second radial pressure beam.

In yet another preferred embodiment of the invention the capstan reel may further comprise an end termination support supportable on the endless chain, wherein the ETS is arranged at or near a spooling-on region or at or near a spooling-off region for the elongated article, for receival, support and release of an end termination arranged at one end of the elongated article. The ETS may be releasably fastened on the first radial pressure beam and the second radial pressure beam by parking means. These parking means may comprise a ETS latch for releasably fixing the ETS in a parked position and a passable retaining member for preventing the ETS to slide in one of its two longitudinal directions on the respective radial pressure beam while being in a parked position, the longitudinal direction being defined as the direction along the length of the radial pressure beams. The parking means on the first radial pressure beam preferably differs from the parking means on the second radial pressure beam in that the parking means on the first radial pressure beam further comprises a non-passable stopper preventing the ETS to slide in the other of its two longitudinal directions on the first radial pressure beam. Further, the ETS and the support elements/chain may be configured so that the ETS is supportable onto at least one ETS support face of the endless chain. The ETS may also comprise a second end termination coupling means for receival of a first end termination coupling means during operation, the first end termination couplings means constituting part of the end termination.

In yet another preferred embodiment of the invention the capstan reel may further comprise a radial pressure track (RPT) arranged on at least one of the cylindrical body's axial ends, wherein said RPT is configured to exert a pressure/holding force on at least one part of the elongated article positioned on the cylindrical body during use. The main purpose of the RPT is to ensure an increased pressure of the elongated articles on the reel's cylindrical cylinder, thus achieving the necessary friction between the chain supporting the article and the underlying cylindrical body. This additional RPT induced pressure is of particular importance when there is a generally reduced counteracting force/tension in respect of the tension caused by the before mentioned tensioners and/or the capstan effect. The counteracting tension is normally set up by the part of the elongated article which has been disattached from the chain after completed turns around the cylindrical body, e.g. the part being vertically suspended from the body, where the part's free end is directed towards, or submerged into, the water. The normally undesired reduction of the counteracting tension may be due to particular operator interventions such as disconnection of the end termination and forerunner rope. Prior to such predicted tension reduction, and until satisfactory counter tension has been reestablished by e.g. lowering a long enough part of the elongated article into the water during laying, the use of RPT may prove efficient to ensure stable operation. A skilled person may envision additional or alternative use of such a RPT, e.g. to use RPT as a tool to further relieve the required tension from the tensioners.

Note that the above disclosure of the invention gives no limitation as to the transfer guide other than it should transfer the endless chain from one axial end of the cylindrical body to the other axial end. It may therefore be arranged outside as well as partly inside the body. The latter may be convenient if the capstan reel is constructed without some or all of the interior parts of the body such as a rotational center shaft or hub and/or spokes.

The invention may also be used for hoisting of elongate articles from the water and into the laying ship, i.e. a process which is reverse of the laying procedure.

As a first alternative to the above main invention, it is also provided a capstan reel of the same type as above, but where inventive characteristics are given by the radial pressure beams as disclosed in claim 10, thus at least partly replacing the characterizing features concerning the endless chain in claim 1. More specifically, in the alternative invention a capstan reel is provided for transporting an elongated article between a floating vessel and a body of water situated below the vessel, wherein the capstan reel comprises a rotatable cylindrical body for spooling the elongated article around the body's axial axis, said body comprising a cylindrical contacting surface for indirectly supporting at least a portion of the elongated article. The alternative capstan reel further comprises a chain spooled at least partly around the cylindrical body acting as an intermediate layer between the cylindrical contacting surface and the intended elongated article, a chain transfer guide extending across the axial length of the cylindrical body for guiding the endless chain between a chain exit region (T) in a first axial end region of the cylindrical body and a chain entry region (E) in a second axial end region, the second axial end region being situated at the opposite axial end of the cylindrical body, and a first radial pressure beam and a second radial pressure beam connected to the cylindrical body at or near the chain exit region (T) and the chain entry region (E), respectively, the radial pressure beams being configured to ensure desired spatial positioning of the chain during exit out of, and re-entry into, the cylindrical body. Any further details herein of radial pressure beams constitute part of second alternative invention.

As a second alternative to the above main invention, it is also provided a capstan reel of the same type as above, but where inventive characteristics are given by the end termination support (ETS) as disclosed in claim 12 and, if the capstan reel also comprises radial pressure beams, preferably including the limitation(s) of one of claims 13-17, thus at least partly replacing the characterizing features concerning the endless chain in claim 1. More specifically, in the second alternative invention a capstan reel is provided for transporting an elongated article between a floating vessel and a body of water situated below the vessel, wherein the capstan reel comprises a rotatable cylindrical body for spooling the elongated article around the body's axial axis, said body comprising a cylindrical contacting surface for indirectly supporting at least a portion of the elongated article. The alternative capstan reel further comprises a chain spooled at least partly around the cylindrical body acting as an intermediate layer between the cylindrical contacting surface and the intended elongated article, and an end termination support (ETS) supportable on the endless chain, wherein the ETS is arranged at or near a spooling-on region (P) or at or near a spooling-off region (U) for the elongated article, for receival, support and release of an end termination arranged at one end of the elongated article. In the preferred case that a first and second radial pressure beam constitute part of the second alternative invention, these first and second radial pressure beams are as for the main invention and the first alternative invention connected to the cylindrical body at or near the chain exit region (T) and the chain entry region (E), respectively, where the radial pressure beams being configured to ensure desired spatial positioning of the chain during exit out of, and re-entry into, the cylindrical body. A chain transfer guide would then extend across the axial length of the cylindrical body for guiding the chain between a chain exit region (T) in a first axial end region of the cylindrical body and a chain entry region (E) in a second axial end region, where the second axial end region is situated at the opposite axial end of the cylindrical body. Any further details referred herein of the ETS, and if applicable the radial pressure beams, may constitute part of second alternative invention.

As a third alternative to the above main invention, it is also provided a capstan reel of the same type as above, but where inventive characteristics are given by the radial pressure beams as disclosed in claim 18 or 19, thus at least partly replacing the characterizing features concerning the endless chain in claim 1. More specifically, in the third alternative invention a capstan reel is provided for transporting an elongated article between a floating vessel and a body of water situated below the vessel, wherein the capstan reel comprises a rotatable cylindrical body for spooling the elongated article around the body's axial axis, said body comprising a cylindrical contacting surface for indirectly supporting at least a portion of the elongated article. The alternative capstan reel further comprises a chain spooled at least partly around the cylindrical body acting as an intermediate layer between the cylindrical contacting surface and the intended elongated article, and a radial pressure track (RPT) arranged on at least one of the cylindrical body's axial ends, wherein said RPT is configured to exert a pressure/holding force on at least one part of the elongated article positioned on the cylindrical body during use. Any further details referred herein of the RPT may constitute part of third alternative invention.

Common for the first, second or third alternative inventions disclosed above is that they do not require an endless chain configuration.

For the sake of clarity, for all inventions the formulations above and for the attached claims shall be interpreted as involving one or more chains, one or more chain transfer guides, one or more first and second radial pressure beams, one or more ETSs, one or more RPTs, etc.

The invention also includes a vessel having a hull and a deck for laying and retrieving/hoisting an elongated article into or out of a body of water, and which comprises a capstan reel in accordance with the features given in the above disclosure.

BRIEF DESCRIPTION OF THE DRAWINGS

These and other characteristics of the invention will be clear from the following description of a preferential form of embodiments, given as non-restrictive examples, with reference to the attached drawings wherein:

FIGS. 4*a* and 4*b* show a perspective view and a front view, respectively, of an embodiment of the capstan reel in accordance with the invention, supporting a flexible pipe and an endless chain of cradles wrapped a certain number of times around the reel's cylindrical body;

FIGS. 5*a* and 5*b* show perspective views of a first embodiment of an assembled cradle in accordance with the invention;

FIGS. 7*a*, 7*b* and 7*c* show principle sketches of an embodiment of an end termination support in accordance with the invention at various stages of supporting the flexible pipe's end termination and its associated components;

FIGS. 8*a* and 8*b* show perspective views of an embodiment of the end termination support in accordance with the invention, in which FIGS. 8*a* and 8*b* show the end termination of the flexible pipe in a supported and non-supported state, respectively;

DETAILED DESCRIPTION OF A PREFERENTIAL EMBODIMENT

The skilled person will know the distinction between flexible pipes and rigid pipes. While flexible pipes have a relatively short minimum bend radius without plastic deformation (e.g. of the order of a few meters), rigid pipes have a minimum bend radius without plastic deformation which is relatively large (e.g. of the order of several tens of meters). While this description refers to the general term "flexible pipe", it should be understood that such term covers not only true flexible tubular pipes, but also flexible risers, umbilicals, fiber rope and the flexible cables that a laying vessel may have to lay. The skilled person will understand that the invention is applicable also for the installation of rigid pipes, and that a reverse bending straightener in such case may be required.

Figure 1:
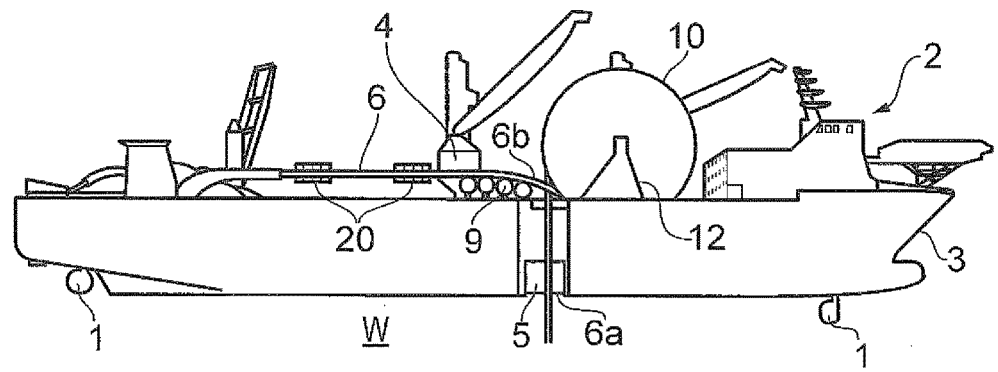
FIGS. 1 and 2 show a side view and a top view, respectively, of an embodiment of the pipe laying ship in accordance with the invention.
Figure 2:
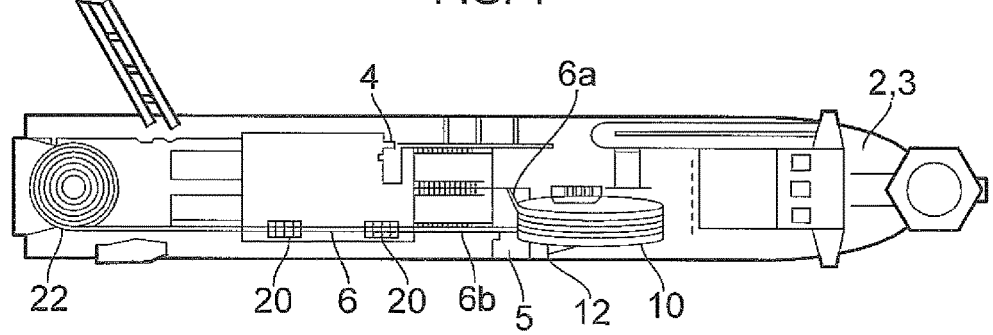

FIGS. 1 and 2 show an installation vessel, or pipe laying ship 2, supporting a flexible pipe 6 in a body of water W. Propulsion units (thrusters) 1 control the ship's movement. In general the vessel is preferably controlled by state of the art dynamic positioning devices 1. The flexible pipe 6 is fed into the water in a more or less vertical orientation through a moonpool 5 in the ship's hull 3. The maximum weight of the suspended flexible pipe 6a may be considerable (depending i.a. on the water depth), e.g. on the order of 300 to 500 metric tonnes.

Onboard the ship, the flexible pipe 6 is in the illustrated embodiment stored on a horizontal storage drum 22 and is conveyed to a capstan reel 10 by one or more tensioners 20. The tensioners 20 are of a type which is commonly known in the art, but need only be relatively light tensioners (compared to the tensioner required in conventional vertical lay systems, i.e. so-called VLS). Although not illustrated, it should be understood that the storage drum 22 may be replaced by a plurality of smaller spools which e.g. are placed on the ship's lower deck.

That portion of the flexible pipe 6 which is extending into the water, and—as the laying process progresses—onto the seabed (not shown), and hence is suspended by the laying ship, is denoted by reference number 6a. That portion of the flexible pipe which at any given time is between the storage drum and the capstan reel is denoted by reference number 6b.

Figure 3:
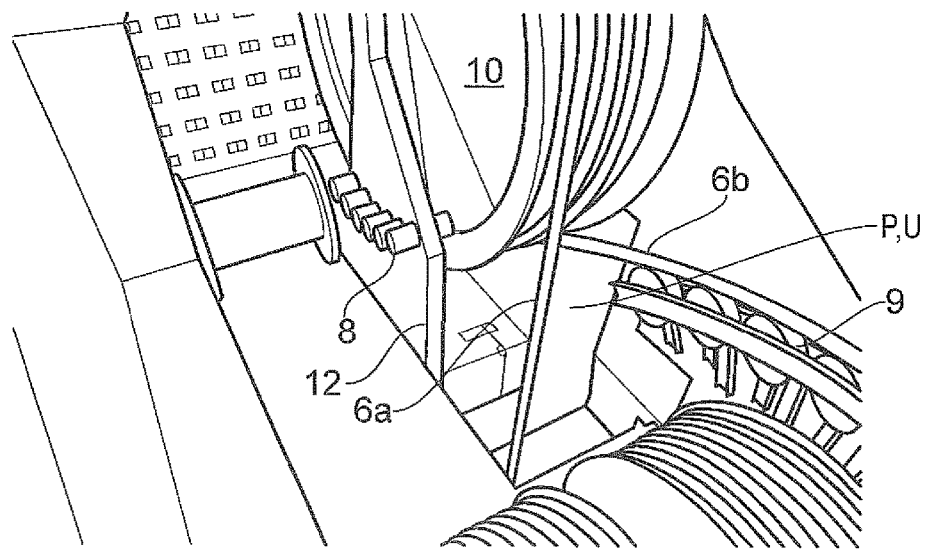
FIG. 3 shows a perspective view of a portion of the pipe laying ship, illustrating a part of the capstan reel and a flexible pipe arranged near the ship's moonpool region.

As shown in FIGS. 2 and 3, the flexible pipe 6 is wound a predetermined number of turns around the capstan reel 10.

The capstan reel 10 is rotatably supported by the hull via a support structure 12. In the illustrated embodiment, the capstan reel 10 comprises a cylindrical body 100. The invention shall, however, not be limited to a strict cylindrical body 100, as other reel shapes (e.g. frustum, opposing cones) are conceivable. The capstan reel 10 is rotatably supported via a plurality of rollers (not shown) along the capstan reel rim, and rotated by one or more capstan reel motors 8 via a rack-and-pinion type gear (not shown). These types of drive means 8 are well known in the art and need therefore not be discussed further. Alternatively, as the skilled person will understand, the capstan reel 10 may alternatively be rotatably supported a conventional central axle 11 (see e.g. FIG. 4a). Access ladders and platforms, control lines, hydraulic reservoirs and lines, which are required for the operation of the capstan reel and ancillary equipment, are well known and therefore not illustrated and discussed here.

In the illustrated embodiment of the installation vessel 2, the capstan reel 10 is placed in front of the moonpool 5 such that the flexible pipe 6 is spooled onto the reel (P) on the same side as it is spooled off (U). This arrangement is convenient from an operational point of view, in that an operator—controlling the operation of the capstan reel from an operator's cabin 4—has visual control with the flexible pipe 6 both as it is entering the capstan reel 10 and as it is leaving it. It should be understood, however, that the invention also covers embodiments where the capstan reel 10 is placed aft of the moonpool 5, thus having the flexible pipe 6 entering and leaving the capstan reel 10 on opposite sides of the reel 10.

In operation, the flexible pipe 6 is wound a number of turns, e.g. more than 3 times, around the capstan reel 10 and fed into (or out of) the water (W) underneath the ship 2 by a controlled and coordinated operation of the capstan reel 10 and the tensioner(s) 20.

In order to ensure that the flexible pipe 6 is entering the capstan reel 10 in a straight, in-line fashion, an alignment-and-radius-control unit (not shown) may be provided. Also, a straightener (not shown) may optionally be included in the moonpool region. These items are well known in the art, and applicable for rigid pipe, such as coiled tubing.

Turning now to FIG. 4 a, the capstan reel 10 is here illustrated in greater detail. In this embodiment of the invention, the perspective drawing of the capstan reel 10 is shown to comprise a cylindrical body 100 having a number of spokes 15 connected to a central axle 11, and side walls—or flanges —14. Arranged around the capstan reel's 10 cylindrical body 100 is an endless chain 18 made up of a plurality of shoes or "cradles" 19 interconnected in an end-to-end relationship. Further, the flexible pipe 6 is shown winded a predetermined number of times around the cylindrical body 100 in a helical form, i.e. having an angle relative to the central axle of the cylindrical body 100 of different than 90°, for example between 75° and 89°.

Figure 4B:
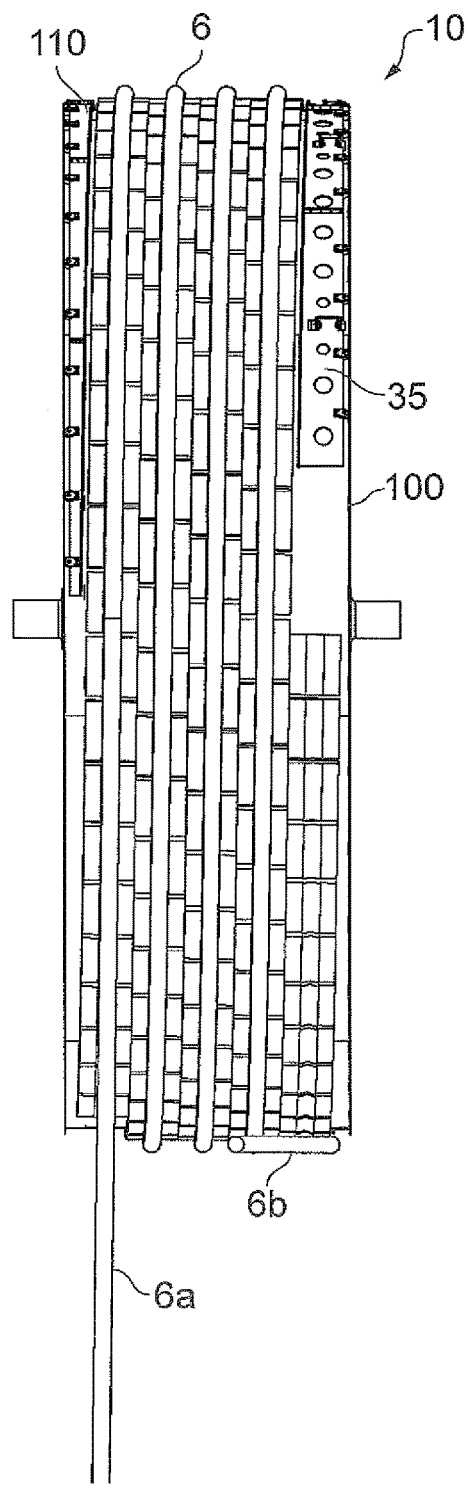

In FIG. 4b part of the capstan reel 10 is illustrated perpendicular to the central axle 11 of the cylindrical body 100. The helical form of the flexible pipe 6 is in this figure more apparent and is a result of both the angle of incidence of the endless chain 18 supporting the flexible pipe 6 and a wedge shaped structure/helical inducing means 110 arranged preferably at one of the side walls 14 of the cylindrical body 100. At the opposite situated side wall 14 a correspondingly mirrored wedge shaped structure 110 can be arranged to further ensure a stable helical movement of the endless chain 18, and thus the flexible pipe 6. The latter wedges shaped structure 110 constitutes in this particular embodiment of the invention an integral part of the support/contacting surface 35 for the endless chain 18.

FIGS. 5a to 5e show a first embodiment of a shoe or cradle 19 in accordance with the invention. The end-to-end relationship between cradles 19 making up the endless chain 18 is obtained by connecting one or more flexible connectors 27 fixed to one cradle 19 to corresponding receptacles 28 fixed to the opposite longitudinal end of an adjacent cradle 19. To allow relative movement between adjacent cradles 19 each flexible connector 27 is in this first embodiment composed of one or more resilient connector elements 27a, e.g. made of polyurethane. Further, the resilient connector element(s) 27a is/are contained in matching connector element holder(s) 27b, the latter being fixed to the connecting longitudinal end of the cradle 19. A releasable coupling to the corresponding receptacles 28 on the adjacent cradle 19 is achieved by inserting a connector pin 27c into the element 27a and holder 27b, followed by fixing a first and second connector limiter 27d,27d' and a first and a second locking ring 27e,27e' onto the two ends of the connector pin 27c. The arrangement protrudes out of at least one of the lateral sides of the resilient connector element 27a causing the limiters 27d,27d' and/or rings 27e,27e' to abut the cradles 19 longitudinal face 34 after a certain longitudinal displacement, thus hindering undesired stresses/wear in the resilient material.

Each cradle 19 further comprises a generally V-shaped support face 29 on which inter alia the flexible pipe 6 is supported when winded around the cylindrical body 100. The geometry of the support face 29 is designed to both provide support for the flexible pipe 6, in addition to restrict undesired relative movements between the flexible pipe 6 and the cradle 19.

Skid rails 30 are positioned on each lateral sides of the central part of the cradle which includes the support face 29, where each skid rail 30 comprises a side skid surface 32, ETS support face 50 (see FIGS. 5a and 5c) and a plurality of rectangular formed skid pads 31 (see FIGS. 5b, 5d and 5e), the latters being preferably replaceable. In this first embodiment no elasticity in the skid pads 31 are required. The ETS support faces 50 will be explained below. The purpose of the side skid surfaces 32 is to provide sliding contact between the cradle 19 and adjacent lateral structures, e.g. adjacent cradles 19 constituting part of the endless chain 18 positioned in an adjacent turn around the cylindrical body 100, or one of the wedge shaped structures 110. The plurality of skid pads 31 ensures a direct contact between the cradle 19 and the reel surface 35 providing friction that is sufficient to maintain the desired capstan effect.

The corrugated surface 33 shown in FIGS. 5a-e increases the frictional contact between the surface 33 and the gripping surface inside a drive unit 16 (see below), thereby facilitating the upholding of the chain movements. To avoid that such corrugated surfaces 33 give an undesired increase in the frictional contact between adjacent cradles 19 belonging to adjacent turns around the cylindrical body 100 it is advantageous that the most protruding parts of each surface 33 do not protrude beyond its corresponding side skid surface 32.

In use, when the plurality of cradles 19 forms the endless chain 18, the combined effect of the flexible connecting means 27,28 and the friction pads 31 allows the cradles 19 to perform mutual rearrangements, and thereby avoiding, or at least limiting, any undesired increase in tension within the typically coaxially arranged flexible pipe 6. Except for such local elongations/retractions the flexible pipe 6 is normally not permitted to slide with respect to the chain 18.

Figure 5A:
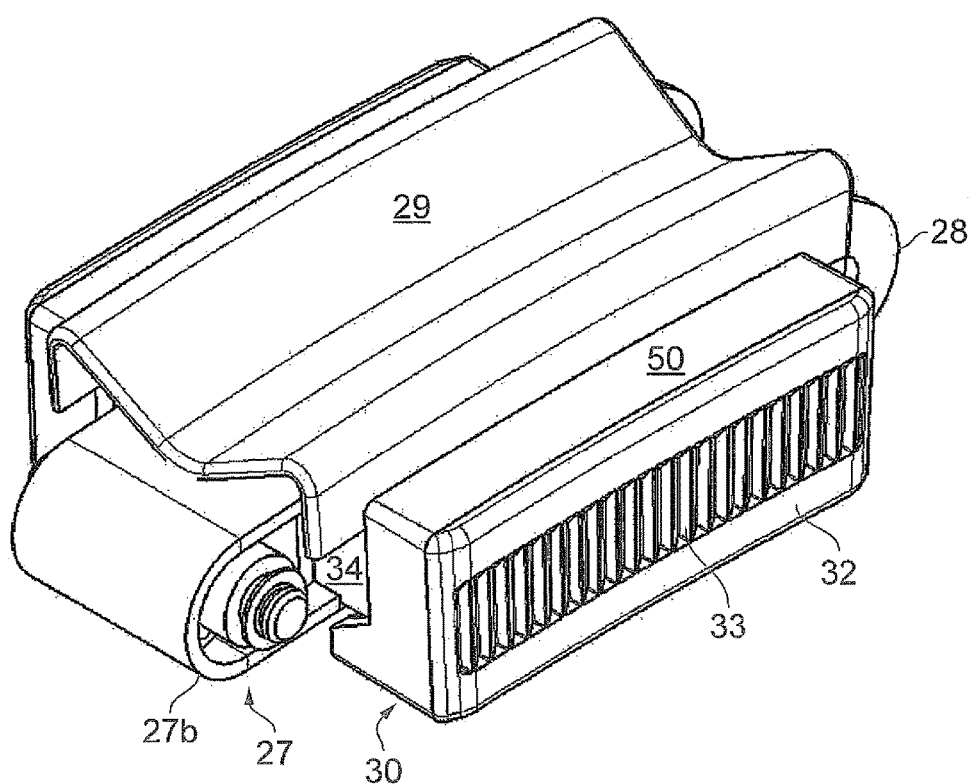
Figure 5C:
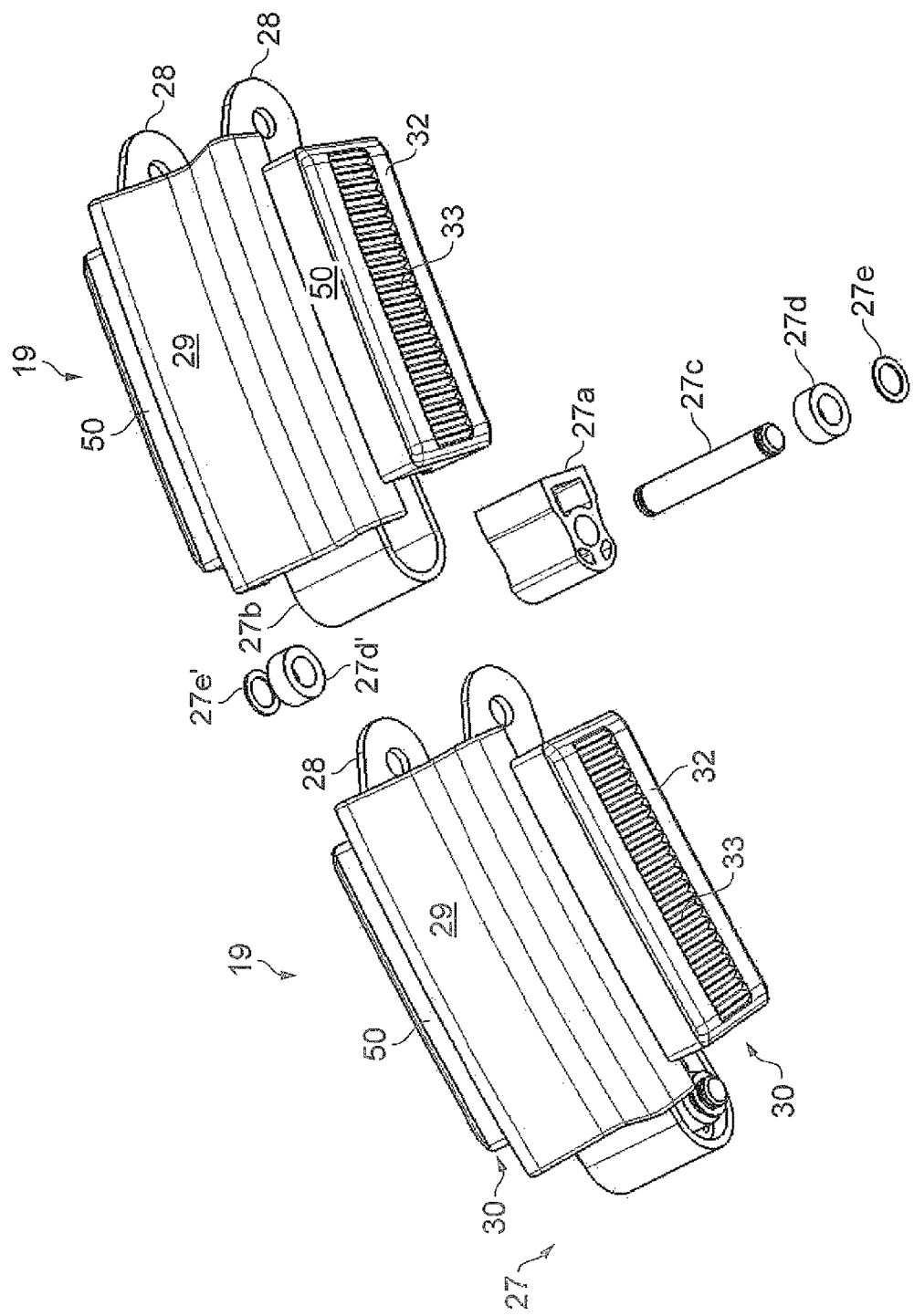
FIG. 5*c* shows a perspective view of two cradles of the type shown in FIGS. 5*a* and 5*b* with an exploded view of the cradle connection means.
Figure 5D:
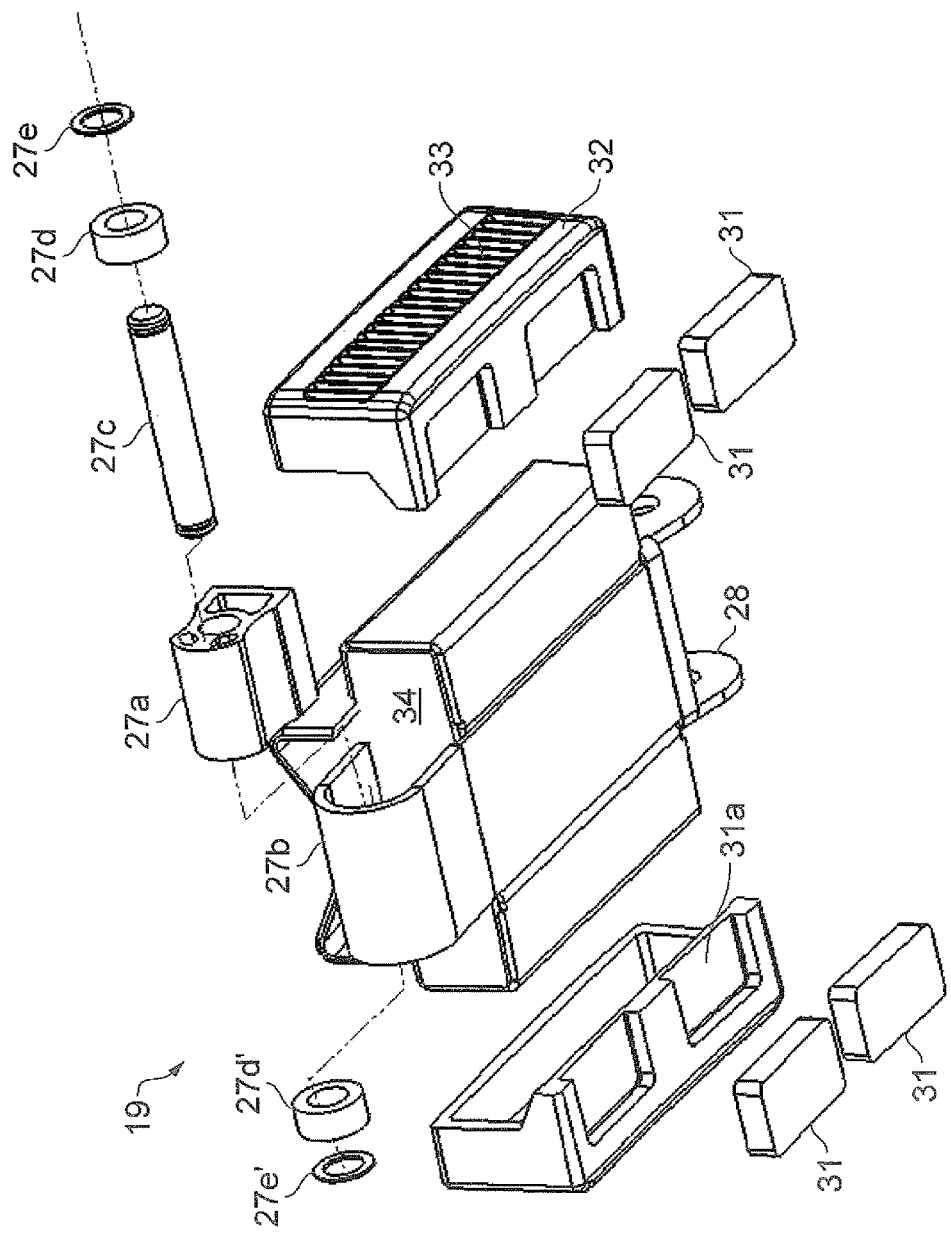
FIG. 5*d* shows an exploded view of a cradle of the type shown in FIGS. 5*a* and 5*b*.
Figure 5E:
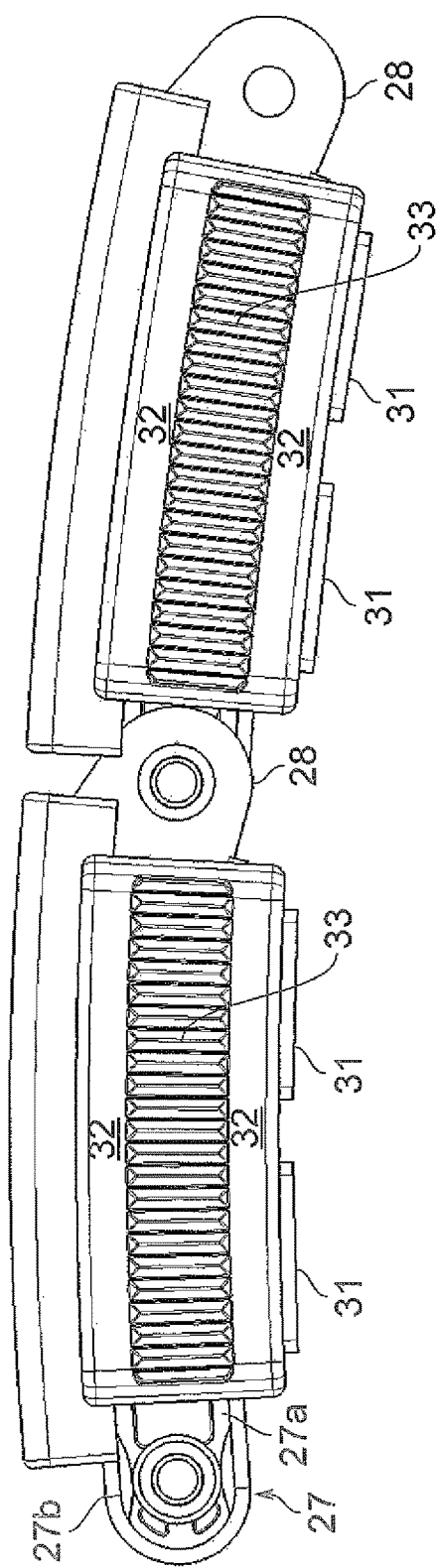
FIG. 5*e* shows a side view of two assembled cradles of the type shown in FIGS. 5*a* and 5*b*.

FIG. 5c shows two disconnected cradles 19, where the different components constituting the flexible connector 27 are shown in exploded view. The preferred matching configuration between the resilient connector element 27a and the connector element holder 27b, as well as between the connector element holder 27b and the adjacent connector receptacles 28, are clearly seen. Further, FIG. 5d shows a fully exploded view of one cradle 19. Each of the mainly rectangular skid pads 31 are shown with corresponding sockets 31a configured to receive the pads 31. In an alternative embodiment the skid pads 31 may be manufactured as an integral part of the cradle 19. FIG. 5d shows a side view of two assembled cradles 19 in accordance with the first embodiment.

Figure 5F:
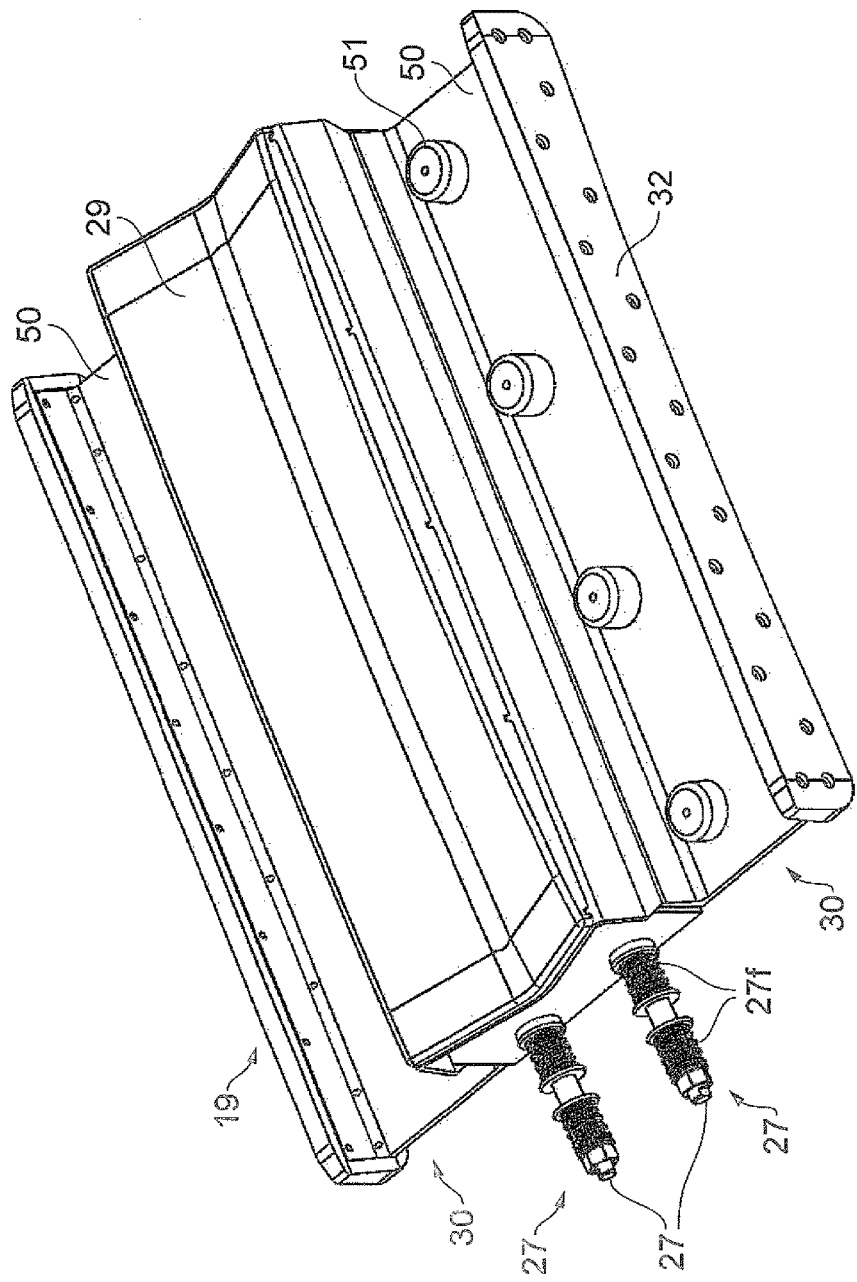
FIGS. 5*f* and 5*g* show perspective views of a second embodiment of an assembled cradle in accordance with the invention.
Figure 5G:
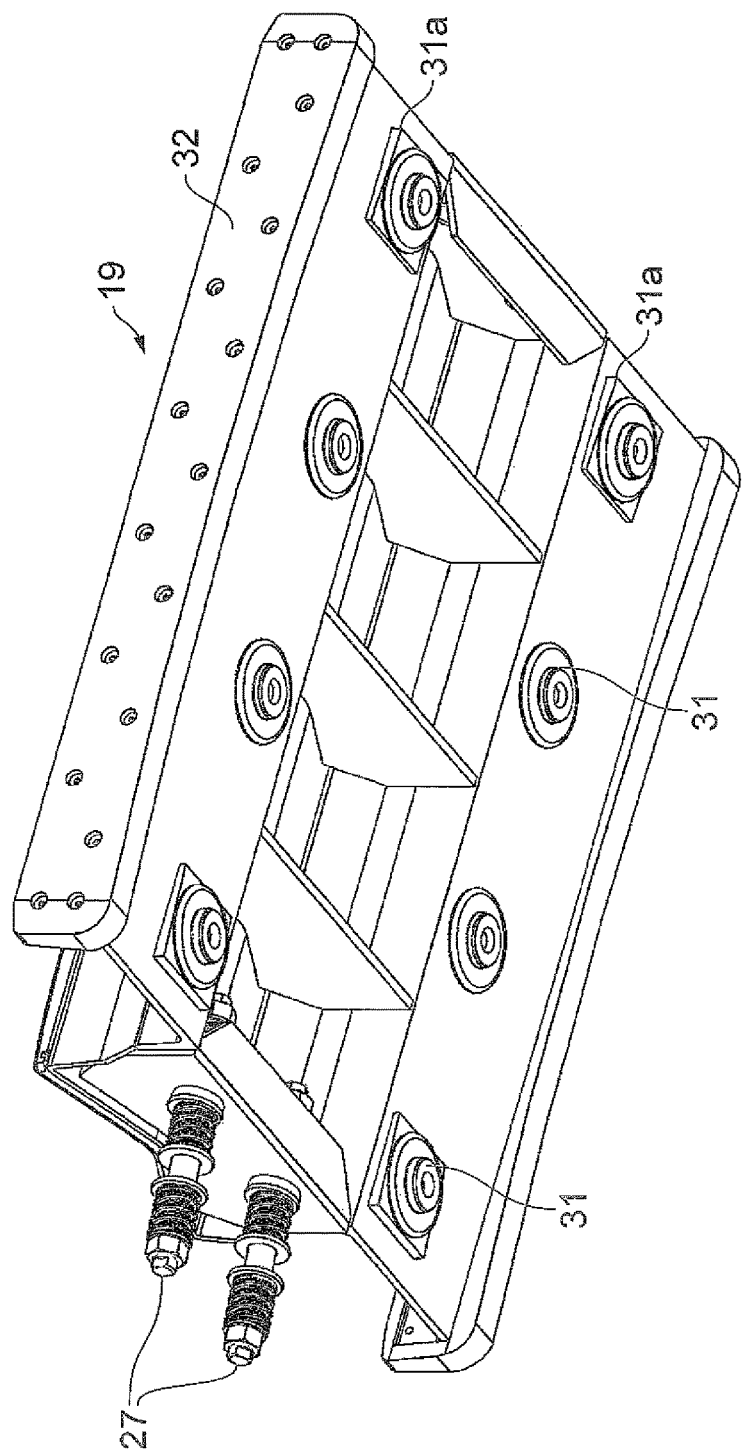

FIGS. 5f and 5g show as an alternative a second embodiment of a shoe or cradle 19 in accordance with the invention. Also in this second embodiment the end-to-end relationship between cradles 19 making up the endless chain 18 is obtained by connecting one or more flexible connectors 27 on one cradle 19 to corresponding receptacles on the other end of an adjacent cradle 19 (relative to the longitudinal direction of the chain 18). To obtain the desired relative movement between the adjacent cradles, each connector 27 includes one or more attached springs 27f.

As for the first embodiment, the cradle 19 further comprises a generally V-shaped support face 29 on which inter alia the flexible pipe 6 is supported when winded around the cylindrical body 100, and skid rails 30 positioned on each lateral sides of the central part of the cradle which includes the support face 29. Further, each skid rail 30 comprises a side skid surface 32, ETS support face 50, a plurality of support protrusions 51 fixed to the ETS support face 50 and a plurality of circular skid pads 31 (see FIG. 5g). Each skid pad 31 is preferably replaceable and connected to the cradle 19 via skid pad sockets 31a, preferably via an elastic member (e.g. a spring, not shown).

As mentioned above, the endless chain 18 constituting an integral part of the capstan reel 10 is wrapped a plurality of turns around the cylindrical body 100, and assumes a helical configuration relative to the body's 100 axial direction, extending between the body's axial flanges 14. The endless chain 18 is transferred from the chain take-off region T in a first axial end region 7a of the cylindrical body 100 to another chain entry region E in a second axial end region 7b by a chain transfer guide 17. In FIG. 4a this chain transfer guide 17 is illustrated as a chute extending relative to the axial direction across the cylindrical body 100. Note that the arrangement of the chain transfer guide 17 may be either outside or inside the cylindrical body 100. In the latter case the capstan reel 10 should not rotate around its central axis 11 or be configured with any spokes 15. A combination is also possible, i.e. a capstan reel 10 with a non-rotating cylindrical body 100 and no spokes 15.

Figure 6A:
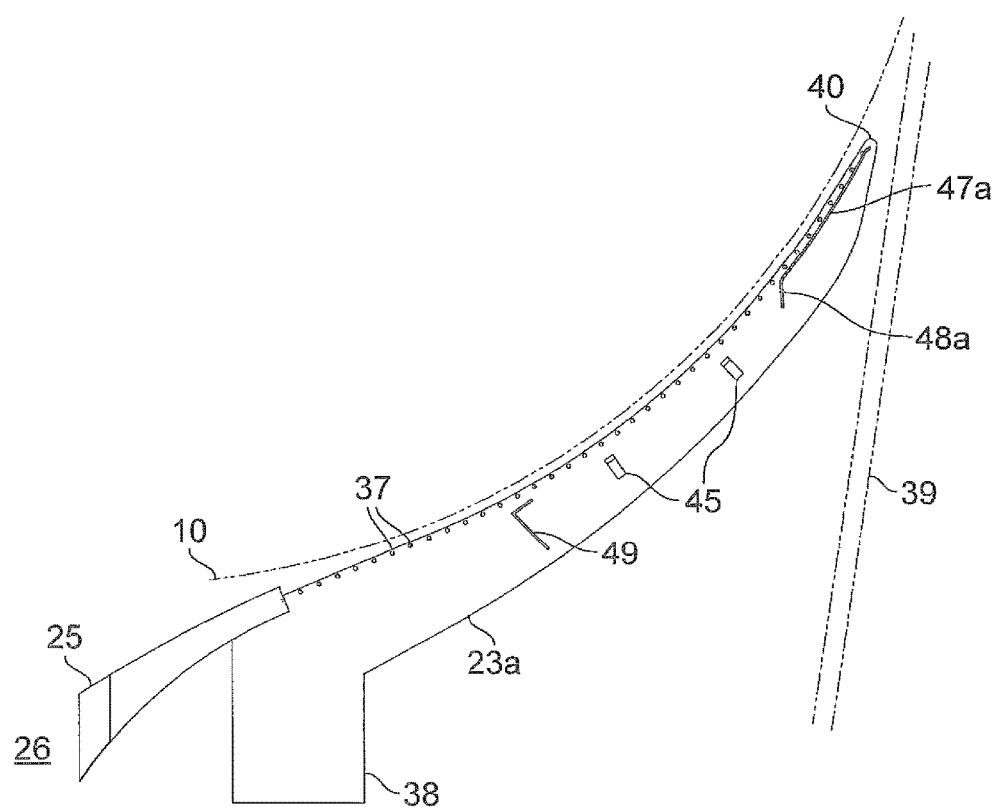
FIG. 6*a* shows a principle sketch of an embodiment of a first radial pressure beam in accordance with the invention.
Figure 6B:
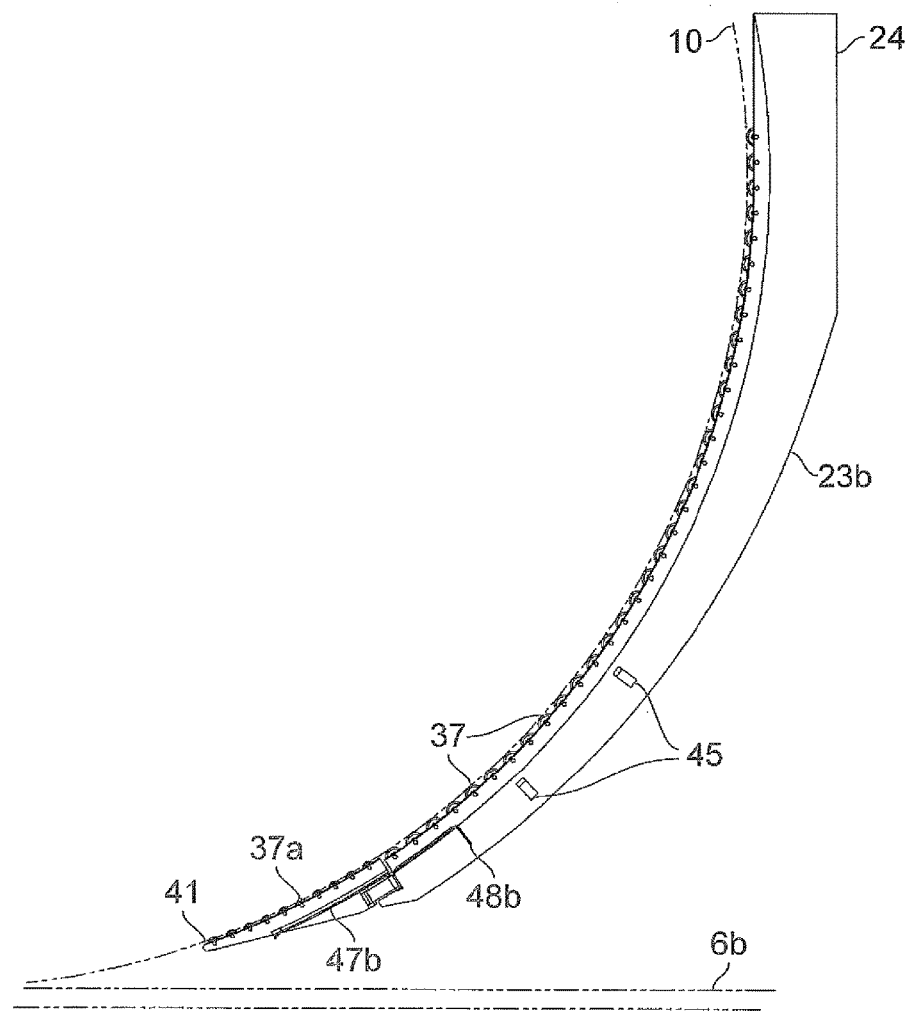
FIG. 6*b* shows a principle sketch of an embodiment of a second radial pressure beam in accordance with the invention.
Figure 6C:
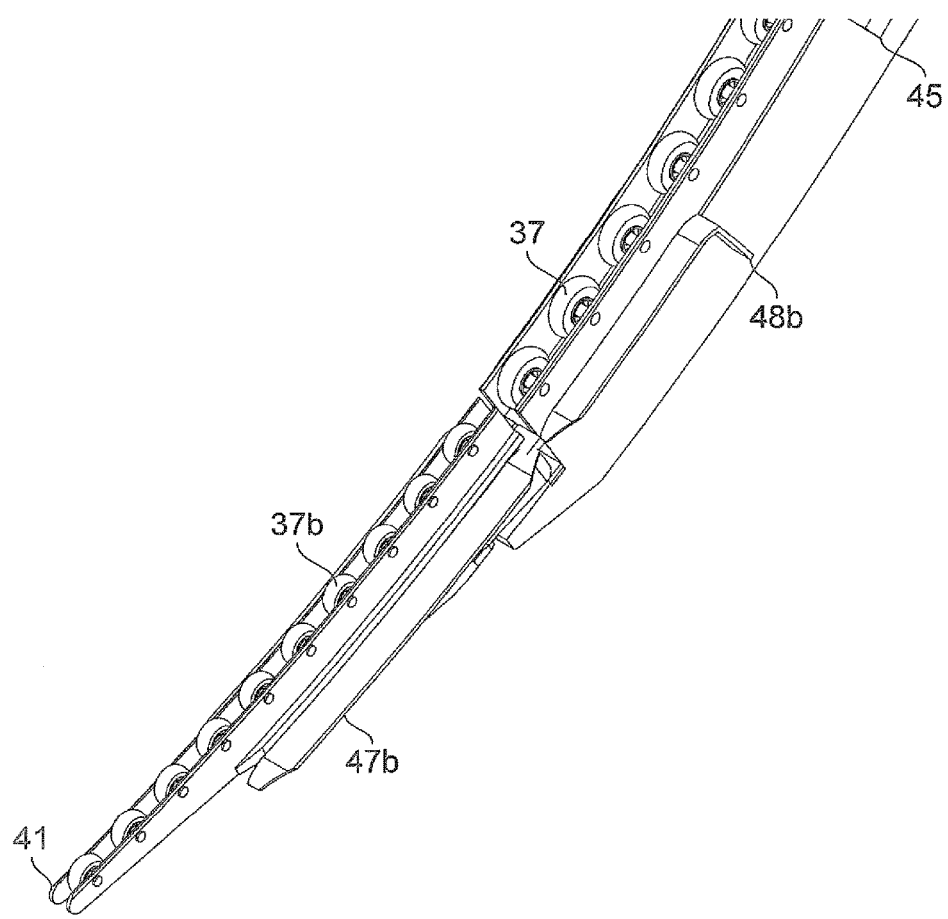
FIG. 6*c* shows a perspective view of the second radial pressure beam's free end in accordance with the invention.

In a laying process the rotation of the reel's 10 cylindrical body 100 would in the arrangement of FIG. 4a be in a clockwise direction. The endless chain 18, which movements around the cylindrical body 100 is at least assisted by a drive unit 16 (e.g. a caterpillar tractor unit), is lifted off the body 100 in the take-off region T and returned to the body 100 in the entry region E. In both regions T, E, so-called radial pressure beams (RPBs) 23a,b are provided, the purpose of which is to control the spatial position of the chain 18 as it leaves the transfer guide 17 and enters the cylindrical body 100, or vice versa. Reference number 23a denotes a first RPB, while reference number 23b denotes a second RPB. FIGS. 6a and 6b show schematic illustrations of the first 23a and second 23b RPBs, respectively. Both RPBs 23a,b have a curvature complementary or near complementary to that of the cylindrical body 100, but with a clearance sufficient for the chain 18 to pass between. Each RPB 23a,b is equipped with runner wheels 37 that are configured for running in the V-shaped support face 29 on each cradle 19 (see FIGS. 5a-b and 6c). The runner wheels 37 are positioned such that there are always at least two, preferably three, wheels in direct contact with each of the relevant cradle 19, thereby ensuring a smooth operation. Both RPBs 23a,b are at least partly connected to the side walls 14 and capable of handling both axial and radial variations of the chain movement. The RPBs 23a,b will therefore not exert any pressure on the chain of cradles 19 towards the cylindrical body 100, but only ensure that the chain 18 is maintained in correct spatial position on the reel 10 in order to e.g. provide room for radial run-outs. Further, the runner wheels 37 are preferably connected to the RPBs 23a,b in such a manner that at least some of the wheels 37 may move slightly sideways on their rotational axles in order to stay in the support face 29 in case the cradle 19 moves sideways.

With further reference to FIG. 6a, the first RPB 23a may be connected to the vessel 2 via a connection element 38. The first RPB 23a extends (and hence guides the chain 18) from the open region 26 underneath the cylindrical body 100 (see FIG. 4a) up to where the flexible pipe 6 and the chain 18 converge into direct contact. As shown both in FIG. 4a and FIG. 6a, a guide funnel 25 guides the chain 18 away from the cylindrical body 100 in order to provide necessary clearance for end terminations 42,43 (to be discussed later). At a longitudinal end 40 of the first RPB 23a situated opposite the end having the guide funnel 25, there is provided sufficient clearance for a forerunner rope 39.

In the laying process indicated by double arrows in FIG. 4a, the function of the forerunner rope 39 is to pull the flexible pipe 6 from the storage drum 22 and to a direction towards the body of water (W), i.e. guiding the pipe 6b through the tensioner(s) 20 and any alignment means 9, entering the cylindrical body 100 in the spooling-on region (P) and finally winding the pipe 6 the required number of turns before spooling the pipe 6a off at the spooling-off region (U). The forerunner rope 39 can be made of any material that is able to withhold the tension set up in the laying and/or retraction process. However, the forerunner rope 39 is preferably made of fiber rope due to the lighter weight compared to e.g. a steel cable of identical length and thickness. By reducing the weight the operational requirements of equipment such as winches may be scaled down thereby lowering cost and liberating space on the vessel 2.

With reference to FIG. 6b, the second RPB 23b may be connected to the vessel 2 via the capstan reel support structure 12. Its purpose is to guide the endless chain 18 from the downstream exit side of the chain transfer guide 17 (see FIG. 4a) while allowing the chain elements or cradles 19 to be stacked in a more or less abutting relationship prior to positioning the incoming flexible pipe 6b onto the endless chain 18 in the case of a laying operation. The abutment is enabled by the reduced friction due to the before mentioned friction pads 31 and the flexible connectors 27. In this manner, the chain 18 appears in its least elongated state, i.e. without any sagging down from the exit side of the chain transfer guide 17, when the chain 18 and the flexible pipe 6b converge in direct contact. The runner wheels 37 serve to further reduce the friction between the second RPB 23b and the chain 18, thereby allowing a more efficient stacking of the cradles 19 via the flexible connector 27. In order for the second RPB 23b to support as much of the chain 18 as possible, the longitudinal free end 41 situated at the longitudinal end of the second RPB 23b opposite to the end nearest to the chain transfer guide 17 is relatively slender and equipped with smaller runner wheels 37a (see FIG. 6c) compared to the rest of the second RPB 23b. This ensures better clearance for the flexible pipe 6, the forerunner rope 39 and the bend stiffeners 43 (not shown in FIGS. 6a-c).

The radial pressure beams 23b have preferably peripheral/longitudinal length equal to that which corresponds to the region along the circumference of the cylindrical body 100 from where the chain 18 enters the body 100 to where the flexible pipe 6 enters the body 100 in the case of a laying process. Likewise, the radial pressure beams 23a have preferably peripheral/longitudinal length equal to that which corresponds to the region along the circumference of the cylindrical body 100 from where the chain 18 exits the body 100 to where the flexible pipe 6 exits the body 100 in the case of a laying process. This is clearly illustrated in FIG. 4a.

In the illustrated embodiment of FIG. 4a, the chain transfer guide 17 has an entry funnel 24 connected at its upstream side. As mentioned above the first radial pressure beam 23a is likewise connected to the exit funnel 25. The open region 26 located between the funnels 24,25 may thus be used by operators to perform maintenance and repair works.

In operation, the flexible pipe 6 is supported on the multiple cradle composed endless chain 18 during the winding of the predetermined number of turns around the cylindrical body 10. The endless chain 18 provides—due to the friction pads 31 and the flexible connectors 27—restrictive sliding with respect to the smooth reel surface 35, while the flexible pipe 6 supported by the endless chain 18 is not allowed to slide substantially with respect to the chain 18 during normal operation. The one or more tensioners 20 apply the required back-tension on the flexible pipe 6,6b.

Referring now to FIGS. 7a-c, the flexible pipe 6 and the forerunner rope 39 is commonly interconnected by an end termination 42 and a bend stiffener 43. A support structure 44, hereinafter referred to as a End Termination Support (ETS), is provided to ensure a stable/predictable support for the end termination 42 and the bend stiffener 43 while these and any related components are fed around the cylindrical body 100. FIG. 7c and FIG. 7b illustrate two successive stages of entry (or exit) onto (or out of) the cylindrical body 100, while FIG. 7a illustrates the end termination 42 and the connected bend stiffener 43 being supported by the body 100 via the ETS 44 during winding. When the ETS 44 is in operation, it rests on the ETS support faces 50 (see FIG. 5a) of one or more of the cradles 19. These faces 50 can be provided with one ore more ETS protrusions 51, be manufactured with a certain roughness, have a combination of the two, or in any other way that ensures a satisfactory stable connection between the ETS 44 and the corresponding cradle 19.

Figure 8A:
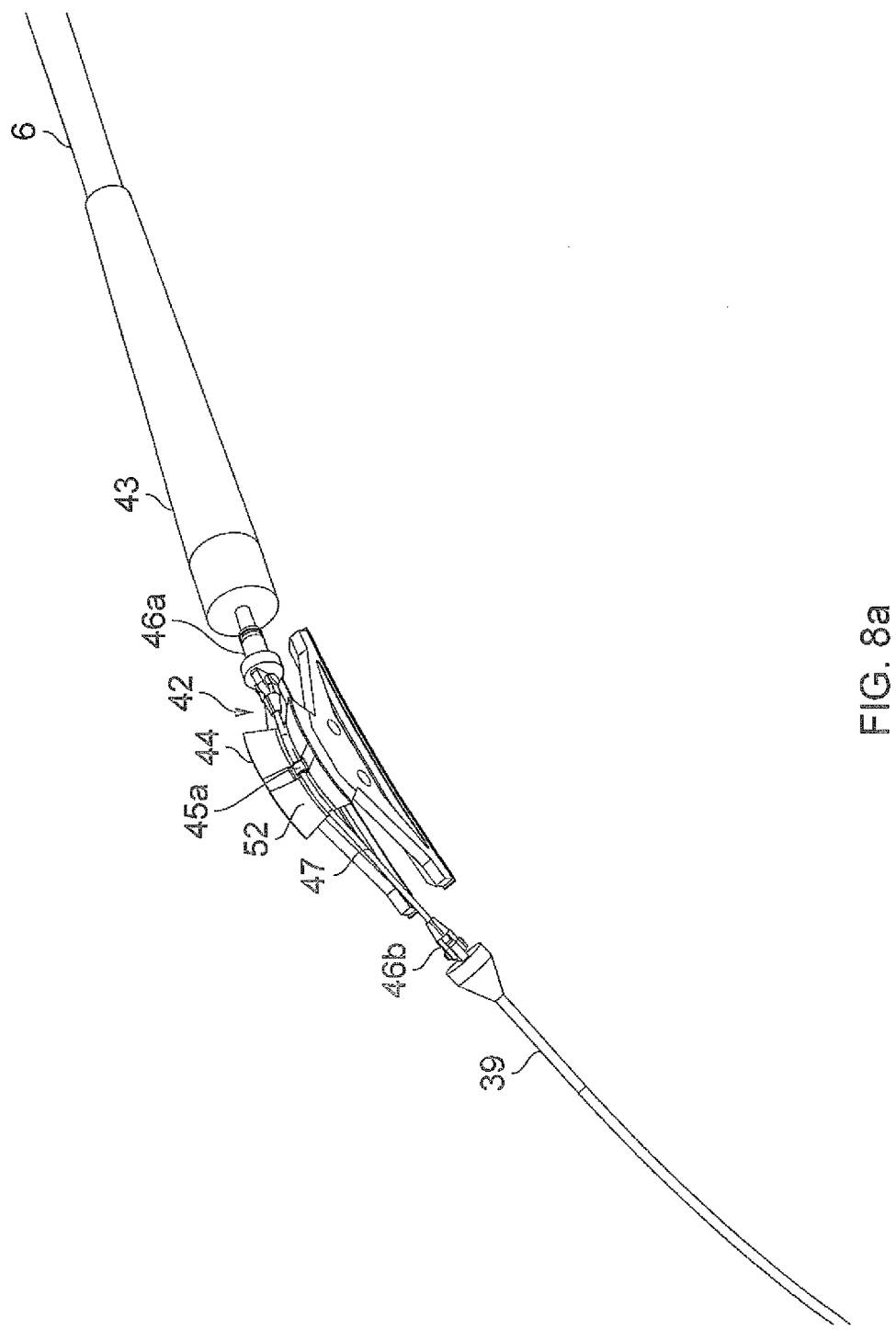
Figure 8B:
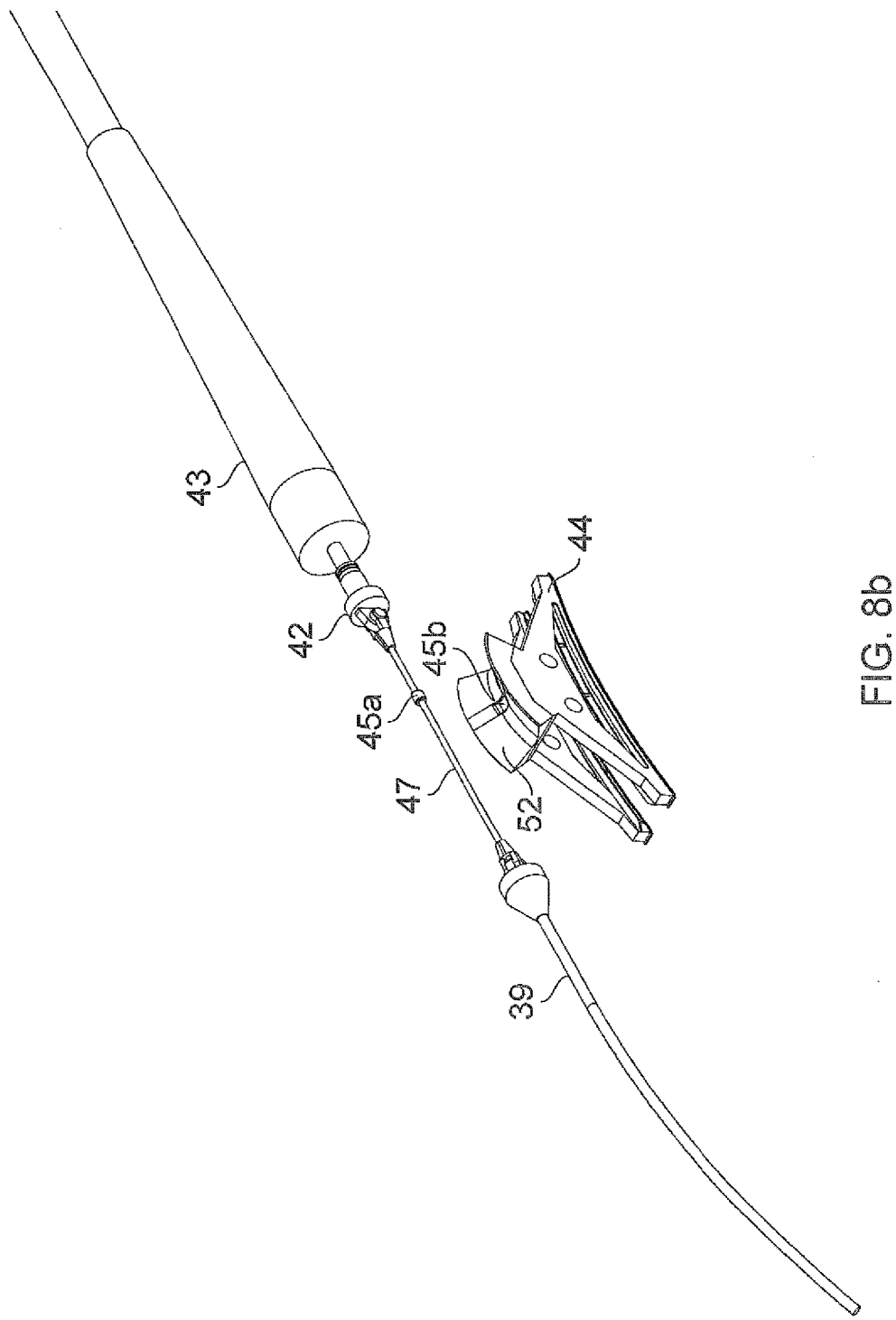

FIGS. 8a and 8b show one particular embodiment of the end termination 42, bed stiffener 43, forerunner rope 39, flexible pipe 6 and the ETS 44 after and before assembling, respectively. In this embodiment the end termination 42 comprises a first termination connector 46a and a second termination connector 46b connected to the bend stiffener 43 and the forerunner rope 39, respectively, a termination cable 47 interconnecting the first and second termination connector 46a,b, and a first end termination coupling means 45a situated on the termination cable 47. The first end termination coupling means 45a is configured to form a stable coupling to a corresponding second end termination coupling means 45b situated at the end termination 42 connecting interface 52 of the ETS 44. To ease the alignment between the end termination 42 and the ETS 44, this connecting interface 52 is preferably U or V-shaped.

Figure 9:
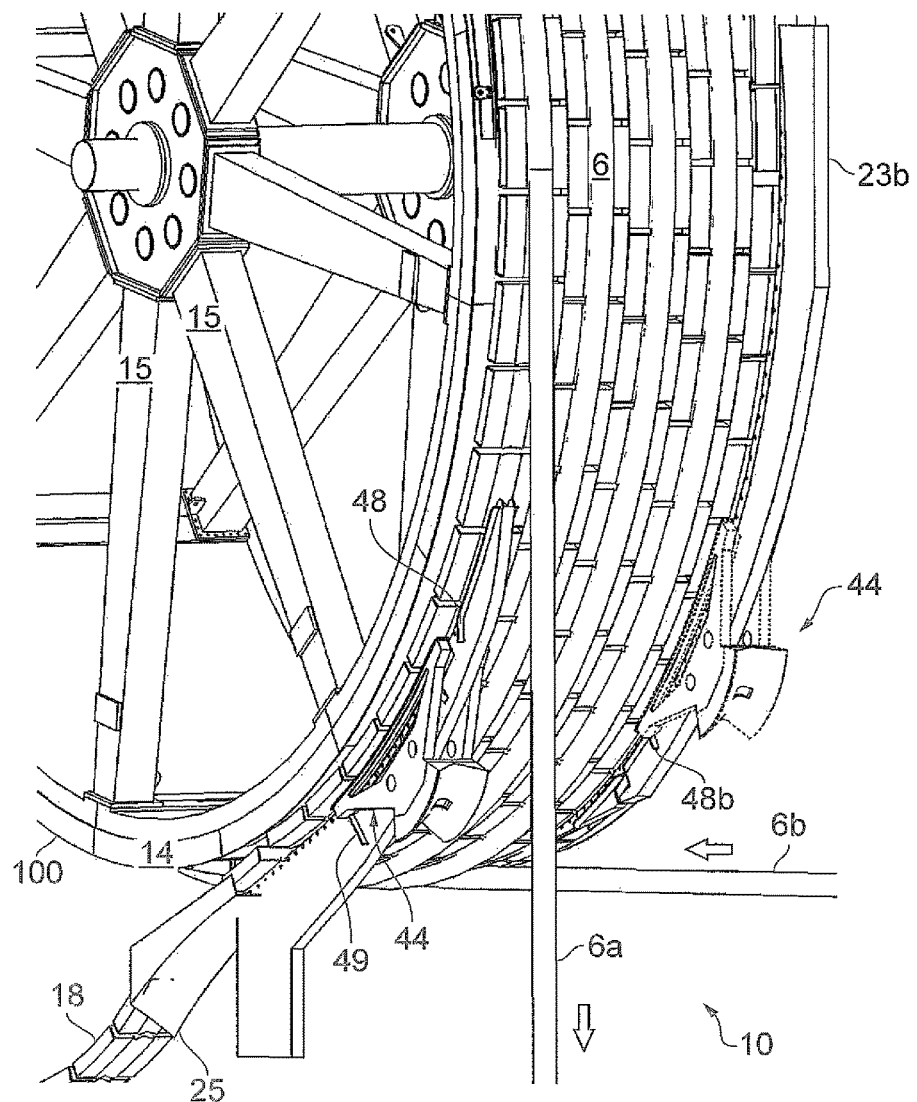
FIG. 9 shows a perspective detailed view of an embodiment of the capstan reel in accordance with the invention, wherein the flexible pipe and an end termination support is shown mounted on the reel's cylindrical body.

FIG. 9 illustrates how the ETS 44 is positioned at the first RPB 23a (solid-drawn lines) and second RPB 23b (dotted lines), indicating end and start positions, respectively, in the case of lowering the flexible pipe 6,6a into the water (laying operation) as indicated by double lined arrows. In such an operation the ETS 44 is initially, i.e. prior to the laying operation, arranged in a lowered, stand-by position on the second RPB 23b, i.e. ready to receive the bend stiffener 43 and the end termination 42 of the flexible pipe 6b. After having successfully coupled the bend stiffener 43 and the end termination 42 to the ETS 44, and subsequently guided the ETS 44 with the elongated article 6,6a,6b,39,42,43,45a, 47 on the endless chain 18 the predetermined number of times around the cylindrical body 100, e.g. 3.75, the ETS 44 is locked in a parked end position on the first RPB 23a. As mentioned above (with reference to FIG. 8) the ETS 44 is designed to mate with an end termination 42 as it enters the cylindrical body 100, both to provide support for the end termination 42 and to lift the end termination 42 sufficiently off the cylindrical body 100 (depending on the bend stiffener radius) as the elongated article makes its way around the body 100 the predetermined number of times between the spooling-on region (P) and the spooling-off region (U). Note that elongated article 6,6a,6b,39,42,43,45a,47 is herein defined as including any component intended to be winded directly or indirectly on the endless chain 18.

Figure 10A:
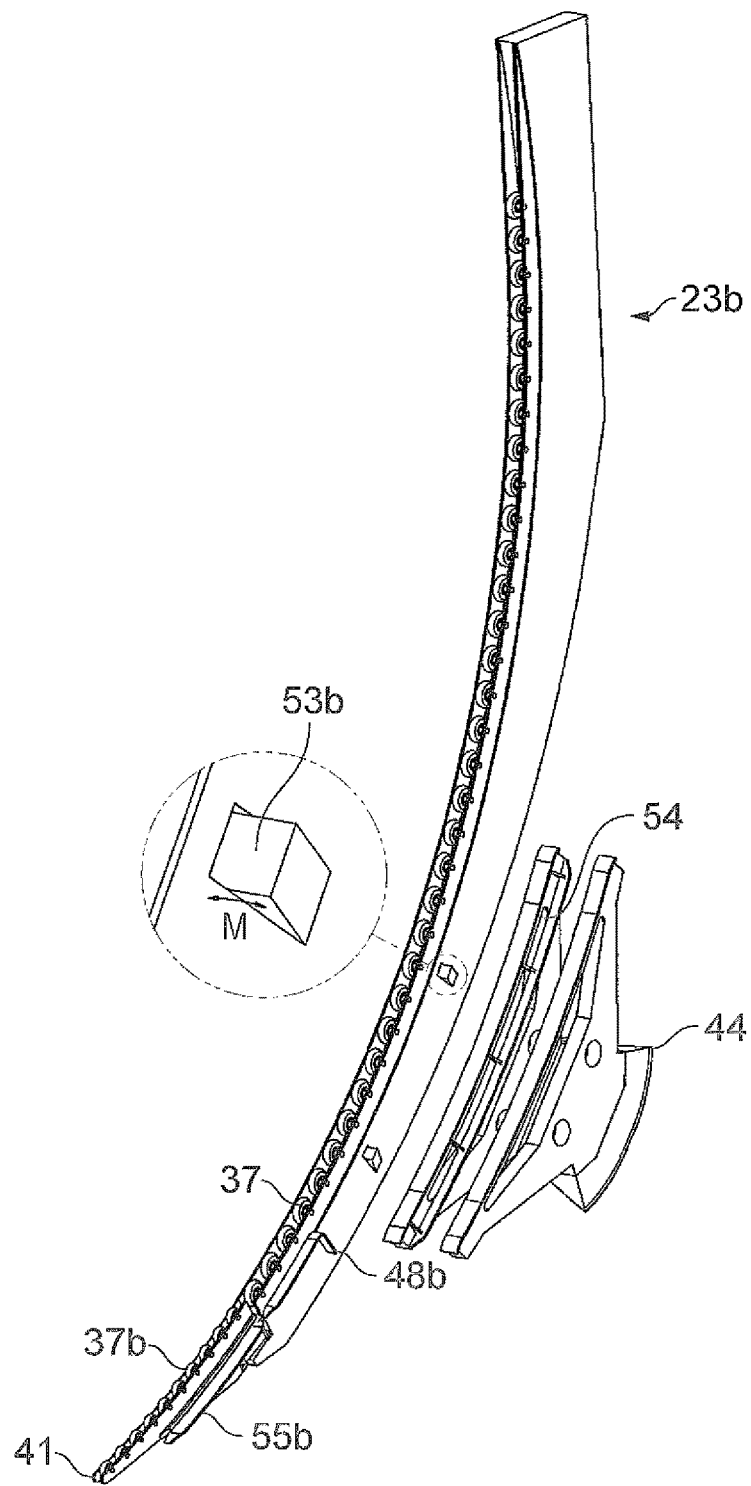
FIG. 10a shows a perspective view of a split drawing of an end termination support on a second radial pressure beam in accordance with the invention.
Figure 10B:
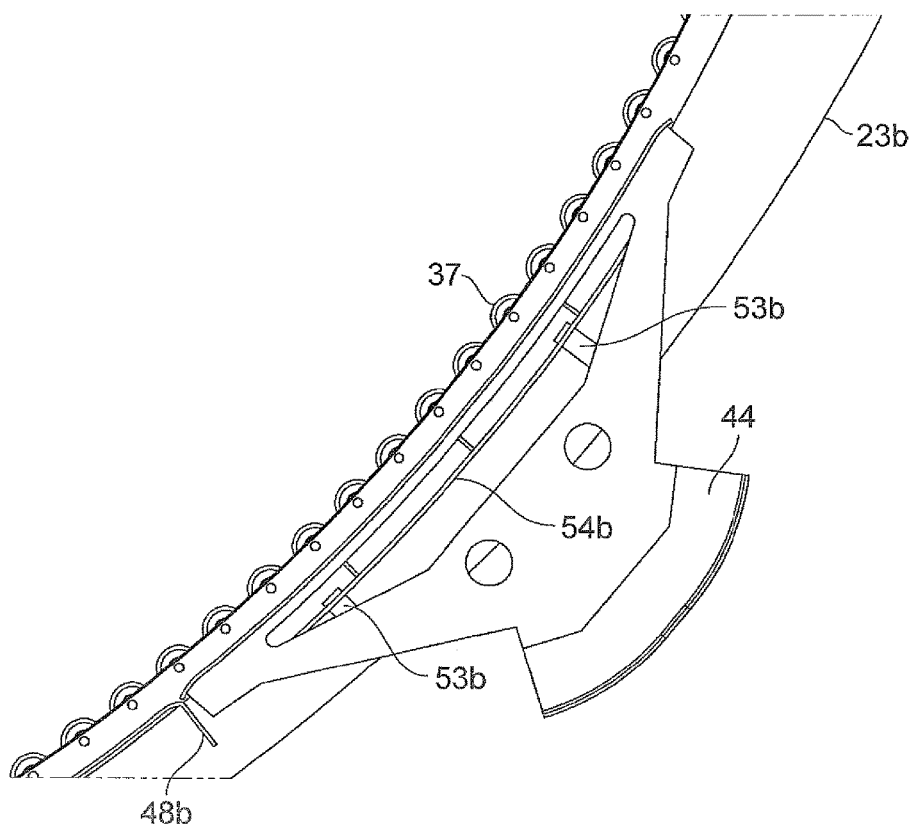
FIG. 10b shows a detailed, partly cut-away assembled drawing of FIG. 10a, illustrating in further details the interface between the end termination support and the second radial pressure beam.

FIGS. 10a and 10b show a split drawing and an assembled drawing, respectively, of an ETS 44 connected in a parked, non-operational state on the second RPB 23b via a pair of second ETS latches 53b. The second ETS latches 53b may be spring-loaded and movable as indicated by the double arrow "M" in the detailed drawing shown in the circular frame in FIG. 10a. The second ETS latches 53b may thus engage an ETS guide rail 54 on the ETS 44. In this non-operational position, the ETS 44 is prevented from sliding downwards by a passable second retaining member 48b on the second RPB 23b at the downstream side of the non-operational ETS 44. When the ETS 44 is to be moved into position for mating with the end termination 42, the ETS 44 is pushed towards the cylindrical body 100. This action releases the ETS 44 from the spring-loaded second ETS latches 53b and allows it to controllably slide downwards, initially guided along the ETS guide rail 54, then, after having surpassed the second retaining member 48b due to the inward directed pressure, guided along a second RPB guide rail 55b on the second RPB 23b, and finally guided around the cylindrical body 100 by the endless chain 18 while being supported on the ETS support faces 50 of its one or more respective cradle(s) 19.

Figure 11A:
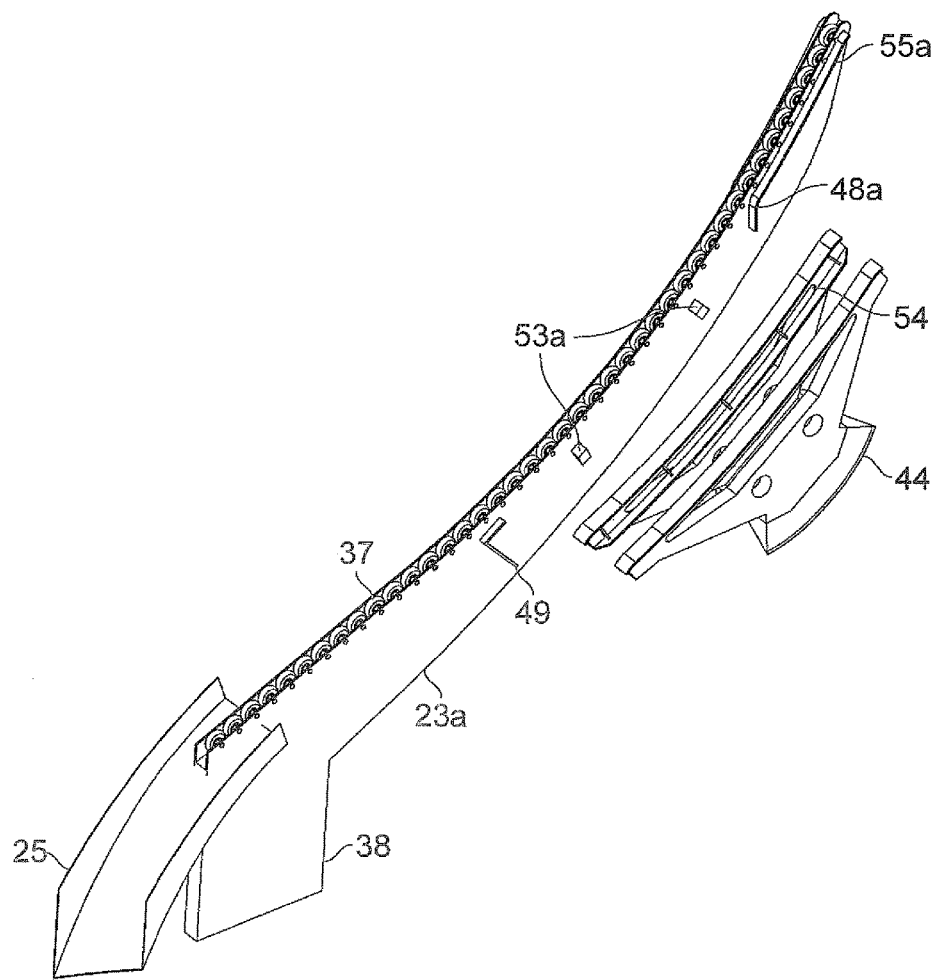
FIG. 11a shows a perspective view of a split drawing of an end termination support situated on a first radial pressure beam in accordance with the invention.
Figure 11B:
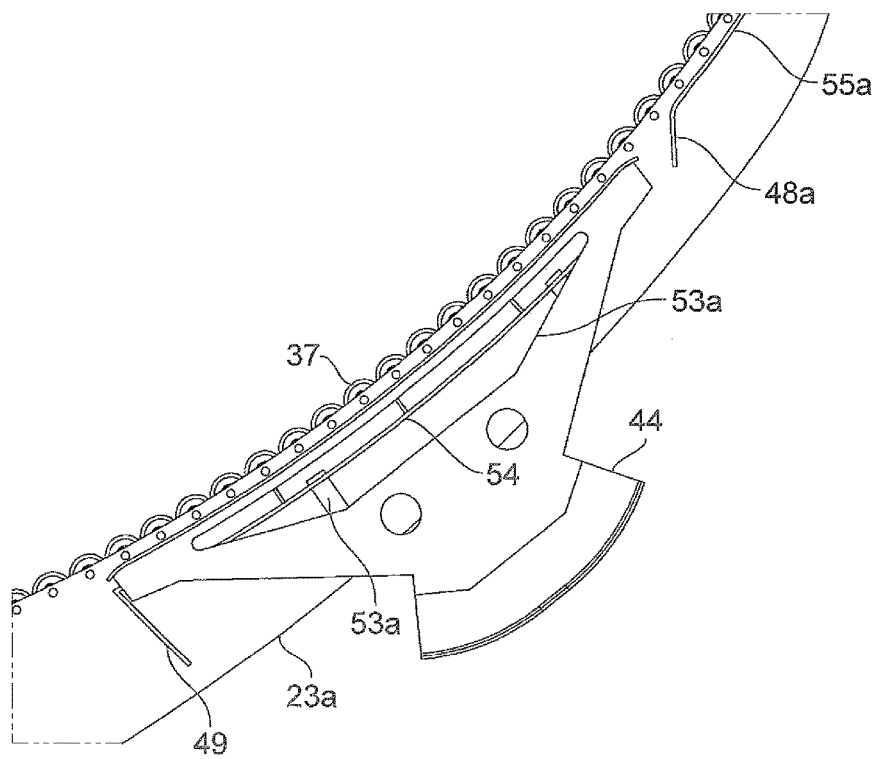
FIG. 11b shows a detailed partly cut-away drawing of FIG. 11a, illustrating in further details the interface between the end termination support and the first radial pressure beam.

Similarly, FIGS. 11a and 11b show a split drawing and an assembled drawing, respectively, of the ETS 44 connected and "parked" on the first RPB 23a via a pair of first ETS latches 53a, e.g. after completed the predetermined number of windings around the cylindrical body 100 during a laying operation. As for the second RPB 23b the spring-loaded first ETS latches 53a are configured to engage the ETS guide rail 54 on the ETS 44. In the parked position shown in FIG. 11b the ETS 44 is prevented from sliding further downwards by a non-passable stopper 49. And similarly to the configuration on the second RPB 23b a passable first retaining member 48a and a first RPB guide rail 55a are situated on the RPB 23a at the upstream side of the parked ETS 44. The first retaining member 48a may be surpassed in the same way as explained for the second retaining member 48b. Note that upstream and downstream side refers herein to the movable directions of parked/non-operational ETS 44.

When an end termination 43 is to be winded onto the cylindrical body 100 during a reverse operation, e.g. during lifting of the flexible pipe 6,6a out of the body of water (lifting operation), the ETS 44, being initially parked on the first RPB 23a, is pushed towards the cylindrical body 100, thereby releasing the ETS 44 from the spring-loaded first ETS latches 53a allowing the ETS 44 to controllably slide upwards, first guided along the ETS guide rail 54, then, after having surpassed the first retaining member 48a, guided along the first RPB guide rail 55a, and finally move around the cylindrical body 100 while resting on the ETS support faces 50 of its respective cradle 19.

In both processes (laying and lifting), when the ETS 44 has completed the task of supporting the bend stiffener 43 and the end termination 42 around the cylindrical body 100 and has been set in the parked position on one of the first or second RPB 23a,b, the user may dismount the ETS 44 and remount it on the opposite situated RPB 23a,b for subsequent receival of an end termination 42 connected to a new flexible pipe 6 and/or an end termination 42 arranged at the opposite end of the same flexible pipe 6. Alternatively the ETS 44 may be dismounted from one of the RPB 23a,b and stored, while another ETS 44 is mounted on the opposite situated RPB 23a,b.

Figure 12A:
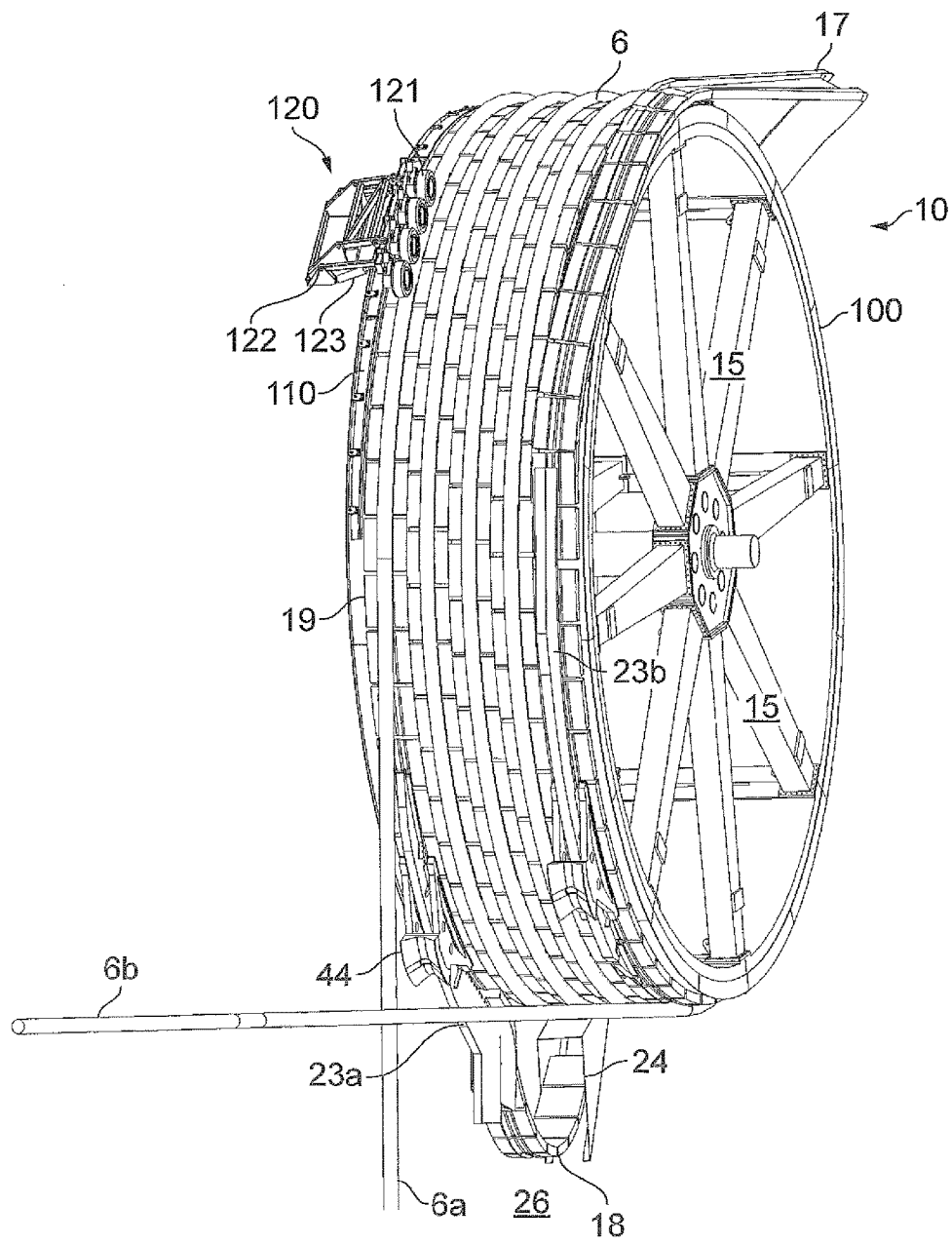
FIGS. 12a and 12b show perspective views of an embodiment of the capstan reel in accordance with the invention including a radial pressure track mounted in an operational and non-operational state, respectively.
Figure 12B:
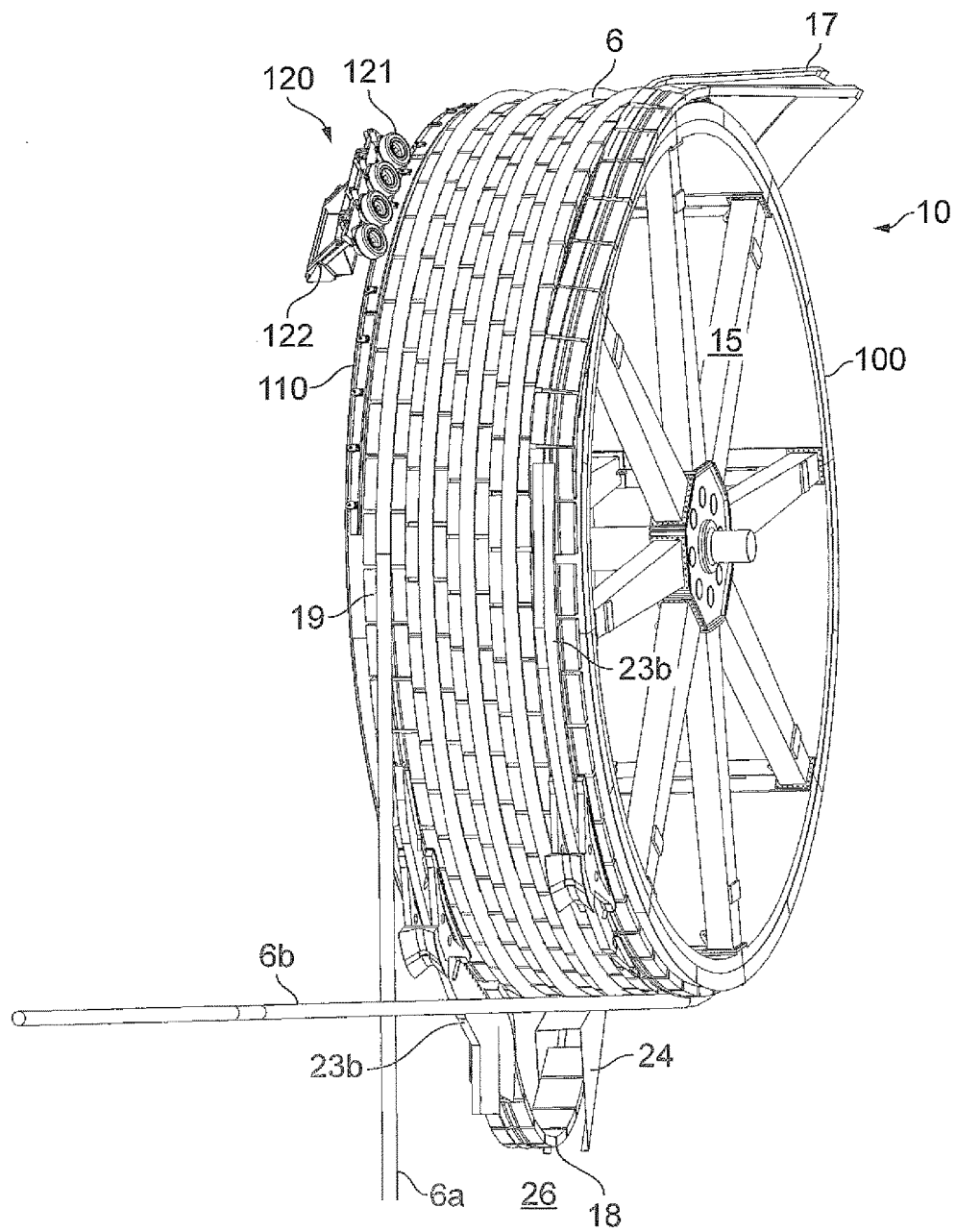

To ensure that stable operation is maintained also in a situation with reduced counteracting tension relative to the tension set up inter alia by the tensioners and/or the capstan effect a radial pressure track (RPT) 120 may advantageously be arranged on the capstan reel 10 that is capable of providing a constant or near constant pressure and/or holding force on the forerunner rope 39 and/or flexible pipe 6 during winding, thereby providing some of the desired counteracting tension/force that else should have been set up by the weight of the suspended part of e.g. the flexible pipe 6a. FIGS. 12 a and b shows the capstan reel 10 with a RPT 120 in accordance with an embodiment of the invention. The RPT 120 is in FIG. 12 a and 12 b shown connected to the sidewall 14 in an operational/folded position and non-operational/unfolded position, respectively. Such a foldable RPT 120 may comprise pipe pressure means 121 such as rotatable wheels, dedicated RPT hinges 122 enabling switching of pipe pressure means 121 between a position with (FIG. 12a) and without (FIG. 12b) direct contact with the forerunner rope 39 and/or flexible pipe 6, and RPT switching means 123 such as hydraulic cylinder(s) to provide a user controlled switching operation.

While the invention has been described with reference to a flexible pipe, it should be understood that the invention is equally applicable for use in handling other flexible articles, such as fiber rope, wire and chains, cables, and rigid pipes.

Although the invention has been described in the context of deploying an elongate article into the water, and the terms "spooling-on region" (P) and "spooling-off region" (U) are used in the description, the skilled person will understand that the invention is equally applicable for the operation of retrieving an elongate article, i.e. reversing the rotation of the cylindrical element.

While the description refers to the flexible pipe being fed into the water through a moon-pool 5, the inventions shall be equally applicable for vessel configurations where the pipe is fed into the water over the side on the vessel, or it stern.

Although the invention has been described with reference to a pipe laying ship, it should not be restricted to such application.

LIST OF REFERENCE NUMERALS/LETTERS

P Spooling-on region
U Spooling-off region
T Chain take-off region
E Chain entry region
W Water, body of water
M Movement of ETS latch
1 Propulsion unit/thruster/dynamic positioning device
2 Installation vessel/pipe laying ship
3 Hull
4 Operator's cabin
5 Moonpool
6 Flexible pipe/flexible riser/umbilical/fiber rope/flexible cable
6a Suspended flexible pipe, part of pipe extended into water
6b Part of pipe between storage drum and capstan reel
7a First axial end region of cylindrical body
7b Second axial end region of cylindrical body
8 Capstan reel motor/drive means
9 Alignment means
10 Capstan reel
11 Capstan reel central axle
12 Support structure for capstan reel
14 Side wall/flange of capstan reel
15 Spoke
16 Drive unit/Caterpillar tractor unit
17 Chain transfer guide
18 Endless chain
19 Shoe, cradle, support element, chain element
20 Tensioner
22 Storage drum, horizontal storage drum
23a First radial pressure beam, first RPB
23b Second radial pressure beam, second RPB
24 Entry funnel
25 Guide funnel
26 Open region
27 Flexible connector
27a Resilient connector element
27b Connector element holder
27c Connector pin
27d First connector limiter
27d' Second connector limiter
27e First locking ring
27e' Second locking ring
27f Connector springs
28 Connector receptacles
29 V-shaped support face
30 Skid rail
31 Skid pad
31a Socket/skid pad socket
32 Side skid surface
33 Corrugated surface
35 Reel surface/Cylindrical contacting surface/Support for the endless chain.
37 Runner wheel
37a Small runner wheel
38 Connection element
39 Forerunner rope
40 Longitudinal end of first RPB
41 Longitudinal end of second RPB
42 End termination
43 Bend stiffener
44 Support structure/End Termination Support/ETS
45a First end termination coupling means
45b Second end termination coupling means
46a First termination connector
46b Second termination connector
47 Termination cable
48a First retaining member
48b Second retaining member
49 Non-passable stopper
50 ETS support face
51 ETS protrusion
52 Connecting interface of the ETS
53a First ETS latch
53b Second ETS latch
54 ETS guide rail
55a Second RPB guide rail
55b Second RPB guide rail
100 Cylindrical body/capstan reel body
110 Helical inducing means
120 Radial pressure track/RPT/foldable RPT
121 Pipe pressure means/rotatable wheels
122 RPT hinge
123 RPT switching means

The invention claimed is:

1. A capstan reel for transporting an elongated article between a floating vessel and a body of water situated below the vessel, wherein the capstan reel comprises:
a rotatable cylindrical body for spooling the elongated article around an axis of the body, wherein the cylindrical body comprises a cylindrical contacting surface for indirectly supporting at least a portion of the elongated article;
an endless chain spooled at least partly around the cylindrical body in a helical direction relative to the axis of the body, acting as an intermediate layer between the cylindrical contacting surface and the intended elongated article; and
a chain transfer guide that extends across the axial length of the cylindrical body for guiding the endless chain between a chain exit region in a first axial end region of the cylindrical body and a chain entry region in a second axial end region that is situated at the opposite axial end of the cylindrical body, and
a drive unit arranged between the chain entry region and the chain exit region that drives the endless chain transferred by the chain transfer guide,
wherein the capstan reel further comprises an end termination support (ETS) supportable on the endless chain, wherein the ETS is arranged at or near a spooling-on region for the elongated article or a spooling-off region for the elongated article, wherein the ETS is configured to receive, support, and release an end termination arranged at one end of the elongated article, and
the ETS is releasably fastened by parking means, on a first radial pressure beam and a second radial pressure beam connected to the cylindrical body at or near the chain exit region and the chain entry region.

2. The capstan reel in accordance with claim 1, wherein the endless chain enters and exits the cylindrical body with a non-zero entry angle and a non-zero exit angle, respectively, the entry angle and the exit angle being defined as the angle relative to the overall rotational direction of the cylindrical body at the chain entry region and the chain exit region.

3. The capstan reel in accordance with claim 2, wherein the angles are identical or near identical to each other.

4. The capstan reel in accordance with claim 1, wherein the capstan reel further comprises helical inducing means at or near either or both of the first axial end region and the second axial end region, wherein the helical inducing means is configured to enforce the helical direction of the endless chain.

5. The capstan reel in accordance with claim 4, wherein at least one of the helical inducing means is situated at or near the chain entry region.

6. The capstan reel in accordance with claim 4, wherein the helical inducing means partly follows the cylindrical contacting surface.

7. The capstan reel in accordance with claim 4, wherein the enforced helical direction is at least partly caused by sliding contact between one or both of lateral sides of the endless chain and at least one of the helical inducing means.

8. The capstan reel in accordance with claim 1, wherein the endless chain is composed of a multiple of support elements arranged in an end-to-end relationship via flexible connecting means, and wherein the connecting means allows relative movement between adjacent support elements.

9. The capstan reel in accordance with claim 8, wherein each support element comprises:
   a support face for supporting the elongated article during winding around the cylindrical body, wherein a geometry of the support face being designed to provide support and to restrict relative movement between the intended elongated article and the corresponding one or more support elements,
   side skid surfaces for providing sliding contact between the support element and at least one adjacent support element in the axial direction of the cylindrical body, and
   skid pads arranged on the side opposite of the support face to provide frictional contact between the support element and the cylindrical contacting surface, wherein the skid pads are configured to ensure a frictional contact that both ensure maintenance of a capstan effect on the elongated article during use and to allow relative longitudinal movement between the support elements.

10. The capstan reel in accordance with claim 1, wherein the radial pressure beams are configured to ensure desired spatial positioning of the endless chain during exit out of, and re-entry into, the cylindrical body.

11. The capstan reel in accordance with claim 10, wherein helical inducing means is one of connected to at least one of the first and second radial pressure beam and formed an integral part of at least one of the first and the second radial pressure beam.

12. The capstan reel in accordance with claim 1, wherein the parking means comprises:
   an ETS latch for releasably fixing the ETS in a parked position; and
   a passable retaining member configured to prevent the ETS from sliding in one of two longitudinal directions on the respective radial pressure beam while being in a parked position, the longitudinal direction being defined as the direction along the length of the radial pressure beams.

13. The capstan reel in accordance with claim 12, wherein the parking means on the first radial pressure beam differs from the parking means on the second radial pressure beam in that the parking means on the first radial pressure beam further comprises a non-passable stopper preventing the ETS to slide in the other of two longitudinal directions on the first radial pressure beam.

14. The capstan reel in accordance with claim 1, wherein the ETS is supported by at least one ETS support face of the endless chain.

15. The capstan reel in accordance with claim 1, wherein the ETS comprises a first end termination coupling means and a second end termination coupling means, wherein the second end termination coupling means receives the first end termination coupling means during operation, and wherein the first end termination couplings means constituting part of the end termination.

16. The capstan reel in accordance with claim 1, wherein the capstan reel further comprises a radial pressure track (RPT) arranged on at least one of the axial ends of the cylindrical body, and wherein, during use, the RPT is configured to exert at least one of a pressure and a holding force on at least one part of the elongated article positioned on the cylindrical body.

17. The capstan reel in accordance with claim 16, wherein, the RPT comprises: rotatable wheels; dedicated RPT hinges enabling switching of the rotatable wheels between a position with and without direct contact with the elongated article; and a hydraulic cylinder providing a user controlled switching operation.

18. A method of controlling a movement of an elongate article suspended by the capstan reel according to claim 1, wherein the method comprises:
   feeding the elongated article onto the capstan reel at a first speed; and
   operating the capstan reel at a rotational speed that is related to the first speed in such a manner as to control a dynamic friction between the elongated article and a surface of the capstan reel.

19. The method of claim 18, wherein feeding the elongated article onto the capstan reel is accomplished by operation of a tensioner.

20. The method of claim 18, wherein the first speed with which the elongated article is fed onto the capstan reel is controlled so as to maintain a relative movement between the capstan reel and the elongated article.

21. A vessel for laying and retrieving an elongated article into or out of a body of water, comprising a hull, a deck, and a capstan reel in accordance with claim 1.

22. The capstan reel in accordance with claim 1, wherein the chain transfer guide is in the form of a chute.

* * * * *